(12) United States Patent
Nonaka et al.

(10) Patent No.: US 6,361,074 B1
(45) Date of Patent: Mar. 26, 2002

(54) STEERING STRUCTURE OF VEHICLE

(75) Inventors: Kenji Nonaka; Kohji Noma, both of Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/643,947

(22) Filed: Aug. 23, 2000

(30) Foreign Application Priority Data

Aug. 30, 1999 (JP) ............................................ 11-242566

(51) Int. Cl.$^7$ ................................................. B62D 1/11
(52) U.S. Cl. ........................ 280/777; 280/750; 180/271; 180/430
(58) Field of Search .............................. 280/777, 748, 280/750; 180/271, 232, 402, 430

(56) References Cited

U.S. PATENT DOCUMENTS

| | | | | |
|---|---|---|---|---|
| 4,795,189 A | * | 1/1989 | Vollmer et al. .............. | 280/801 |
| 5,052,715 A | * | 10/1991 | Ervin et al. ................. | 280/775 |
| 5,174,409 A | * | 12/1992 | Osawa ....................... | 180/274 |
| 5,320,384 A | * | 6/1994 | Arnold et al. ............... | 280/777 |
| 5,368,331 A | * | 11/1994 | Morimoto ................... | 280/777 |
| 5,535,842 A | * | 7/1996 | Richter et al. .............. | 180/279 |
| 5,893,426 A | * | 4/1999 | Shimizu et al. ............. | 180/400 |
| 6,116,371 A | * | 9/2000 | Suyama et al. ............. | 180/444 |
| 6,241,284 B1 | * | 6/2001 | De Verdier et al. ......... | 280/777 |

FOREIGN PATENT DOCUMENTS

| | | |
|---|---|---|
| JP | 11-5543 | 1/1999 |
| JP | 11-11325 | 1/1999 |
| JP | 11-11326 | 1/1999 |

* cited by examiner

Primary Examiner—Brian L. Johnson
Assistant Examiner—Faye M. Fleming
(74) Attorney, Agent, or Firm—Nixon Peabody LLP; Donald R. Studebaker

(57) ABSTRACT

A steering structure of a vehicle is provided in which when a load equal to or greater than a predetermined value is applied from outside to a flexible transmitting member which connects to a steering unit and an operation detecting unit which detects an operation of a steering wheel, a portio of the transmitting member is separated (including both a structure for cutting and separating the transmitting member itself, and a structure for cutting a coupling of the like provided on the transmitting member), so that when the transmitting member is varied at the time of collision, the steering wheel angle is prevented from being varied to enhance safety at the time of collision.

14 Claims, 20 Drawing Sheets

STEERING STRUCTURE OF VEHICLE

BACKGROUND OF THE INVENTION

1. Field of the Invention

The present invention relates to a steering structure of a vehicle such as a so-called cable type steering structure comprising an operation detecting unit for detecting an operation of a steering wheel by a crew member, a steering unit for steering wheels which are to be steered (refer to as "steered wheels", hereinafter), and flexible transmitting members for connecting the operation detecting unit and the steering unit.

2. Description of the Related Art

Conventionally, as the above described steering structure of a vehicle, there exist structures disclosed in Japanese Patent Laid-open Publication HEI 11-5543, HEI 11-11325 and HEI 11-11326, for example.

That is, according to Japanese Patent Laid-open Publication HEI 11-5543, a cable is provided between a pulley (driving pulley) provided on a steering wheel side and a pulley (follower pulley) provided on a steering unit side which steers steered wheels, an outer peripheral face of the driving pulley is curved into a curved concavity, an outer peripheral face of the follower pulley is formed into a curved convex, then a tilting force and a tilting angle of the steered wheels (front wheels) with respect to a rotation force and a rotation angle of the steering wheel are varied, while keeping at ensile force of the cable constant.

According to Japanese Patent Laid-open Publication HEI 11-11325, a cable is provided between a driving pulley provided on a steering wheel side and a follower pulley provided on a steering unit side which steers steered wheels, a pulley housing for accommodating the pulleys such that the pulleys can rotate is provided, a slider which is biased by a spring in a direction separating away from the pulley is mounted in the pulley housing, and when the cable is prolonged by secular changes, a tensile force is applied by the slider to the cable which was reeled around the pulleys, thereby compensating the extension of the cable.

Further, according to Japanese Patent Laid-open Publication HEI 11-11326, a steering wheel operated by a crew member and a steering gear box for steering the steered wheel are connected to each other through a cable comprising an outer member in which an inner member is accommodated, a rotation of the steering wheel is transmitted to the steering gear box through the inner member, the outer member is made of metal pipe material so that the deflection of the outer member is prevented to enhance a rigidity feeling at the time of operation of the steering wheel.

When the cable type steering structure of the above kinds is mounted in a vehicle such as an automobile, it is required not to vary the steering wheel angle by deformation of the cable when a collision of the vehicle occurs, in order to secure safety at the time of the collision.

However, none of the above-mentioned prior arts (Japanese Patent Laid-open Publication HEI 11-5543, HEI 11-11325 and HEI 11-11326) disclose nor indicate the idea and/or constitution for preventing the steering wheel angle from being varied by deformation and/or behavior of the cable, in order to enhance the safety at the time of collision of the vehicle.

SUMMARY OF THE INVENTION

It is an object of a first aspect of the present invention to provide a steering structure of a vehicle in which when a load equal to or greater than a predetermined value is applied from outside to flexible transmitting members which connect an operation detecting unit for detecting an operation of a steering wheel and a steering unit, a portion of the transmitting member is separated (including both a structure for cutting and separating the transmitting member itself, and a structure for cutting a coupling or the like provided on the transmitting member), so that when the transmitting member is varied at the time of collision, the steering wheel angle is prevented from being varied to enhance the safety at the time of collision.

It is an object of a second aspect of the present invention, in addition to the object of the first aspect of the invention, to provide a steering structure of a vehicle in which a predetermined portion of the vehicle corresponding to the transmitting member is provided with a cutting member which is retreated by a load from outside to cut (cut and separate) the transmitting member, thereby reliably cutting the transmitting member at the time of collision of the vehicle.

It is an object of a third aspect of the present invention to provided a steering structure of a vehicle in which a supporting member is provided for supporting the transmitting member at a predetermined portion of the vehicle body, and the supporting member releases the support of the transmitting member from the vehicle body when a relative displacement between the supporting member and the transmitting member exceeds a predetermined amount, so that when a relative displacement between the transmitting member and the supporting member exceeds the predetermined value at the time of collision, the steering wheel angle is prevented from being varied to enhance the safety at the time of collision.

It is an object of a fourth aspect of the present invention, in addition to the object of any one of the first to the third aspects of the invention, to provided a steering structure of a vehicle in which a connecting portion between the transmitting member and the operation detecting unit is disengaged from each other when the transmitting member and the operation detecting unit are relatively moved by a distance equal to or greater than a predetermined value, so that the steering wheel angle is prevented from being varied by behavior of the transmitting member at the time of collision to enhance the safety at the time of collision.

It is an object of a fifth aspect of the present invention, in addition to the object of any one of the first to the fourth aspects of the invention, to provided a steering structure of a vehicle in which a connecting portion between the transmitting member and the steering unit is disengaged from each other when the transmitting member and the steering unit are relatively moved by a distance equal to or greater than a predetermined value, so that the steering wheel angle is prevented from being varied by behavior of the transmitting member at the time of collision to enhance the safety at the time of collision.

It is an object of a sixth aspect of the present invention, in addition to the object of the fifth aspect of the invention, to provide a steering structure of a vehicle in which the transmitting member is connected to the steering unit from the front thereof, and the steering unit and the transmitting member are disconnected from each other when the steering unit is retreated by a load applied from outside so that the transmitting member is disconnected easily at the time of collision, and the safety at the time of collision is further enhanced.

It is an object of a seventh aspect of the present invention to provided a steering structure of a vehicle in which the transmitting member is disposed with a predetermined deflection, so that the behavior is absorbed by the deflection, the steering wheel angle is not affected, the transmitting member is not cut at the time of collision, and minimum running is ensured even at the time of accident.

It is an object of a eighth aspect of the present invention, in addition to the object of the seventh aspect of the invention, to provide a steering structure of a vehicle in which the transmitting member comprises a pair of cables, the pair of cables are supported by a same member (refer to a engine which retreats at the time of collision), thereby preventing the pair of cables from twisting each other.

It is an object of a ninth aspect of the present invention to provide a steering structure of a vehicle in which the transmitting member is supported by a member (refer to a engine) which moves at the time of collision, and the steering wheel is moved forward by a predetermined distance by a retreating movement of the transmitting member so that the transmitting member is not cut at the time of collision, minimum running is ensured even at the time of accident, and the safety at the time of collision is further enhanced by moving the steering wheel forward.

It is an object of a tenth aspect of the present invention to provide a steering structure of a vehicle in which the transmitting member is supported by a member (refer to a engine) which moves at the time of collision, and a pedal is moved forward by a predetermined distance by a retreating movement of the transmitting member so that the transmitting member is not cut at the time of collision, minimum running is ensured even at the time of accident, a crew member's feet are not damaged and the safety at the time of collision is further enhanced by moving the pedal forward.

According to the first aspect of the present invention, there is provided a steering structure of a vehicle comprising an operation detecting unit provided in a cabin for detecting an operation of a steering wheel by a crew member, a steering unit provided in an engine room for steering steered wheels, and a flexible transmitting member for connecting the operation detecting unit and the steering unit, wherein the transmitting member is provided with a portion which is separated when a load equal to or greater than a predetermined value is applied to the transmitting member from outside.

According to the second aspect of the present invention, in addition to the constitution of the first aspect of the invention, a predetermined portion of the vehicle corresponding to the transmitting member is provided with a cutting member which is retreated by a load from outside to cut the transmitting member.

According to the third aspect of the present invention, there is provided a steering structure of a vehicle comprising an operation detecting unit provided in a cabin for detecting an operation of a steering wheel by a crew member, a steering unit provided in an engine room for steering steered wheels, and a flexible transmitting member for connecting the operation detecting unit and the steering unit, wherein a supporting member is provided for supporting the transmitting member at a predetermined portion of a body of the vehicle, and the supporting member releases the support of the transmitting member from the body of said vehicle when a relative displacement between the supporting member and the transmitting member exceeds a predetermined amount.

According to the fourth aspect of the present invention, in addition to the constitution of any one of the first to the third aspects of the invention, a connecting portion between the transmitting member and the operation detecting unit is disengaged from each other when the transmitting member and the operation detecting unit are relatively moved with a relative displacement equal to or greater than a predetermined value.

According to the fifth aspect of the present invention, in addition to the constitution of any one of the first to the fourth aspects of the invention, a connecting portion between the transmitting member and the steering unit is disengaged from each other when the transmitting member and the steering unit are relatively moved with a relative displacement equal to or greater than a predetermined value.

According to the sixth aspect of the present invention, in addition to the constitution of the fifth aspect of the invention, the transmitting member is connected to the steering unit from a front thereof, and the steering unit and the transmitting member are disconnected from each other when the steering unit is retreated by a load applied from outside.

According to the seventh aspect of the present invention, there is provided a steering structure of a vehicle comprising an operation detecting unit provided in a cabin for detecting an operation of a steering wheel by a crew member, a steering unit provided in an engine room for steering steered wheels, and a flexible transmitting member for connecting the operation detecting unit and the steering unit, wherein the transmitting member is disposed with a predetermined deflection.

According to the eighth aspect of the present invention, in addition to the constitution of the seventh aspect of the invention, the transmitting member comprises a pair of cables, the pair of cables are supported by a same member.

According to the ninth aspect of the present invention, there is provided a steering structure of a vehicle comprising an operation detecting unit provided in a cabin for detecting an operation of a steering wheel by a crew member, a steering unit provided in an engine room for steering steered wheels, and a flexible transmitting member for connecting the operation detecting unit and the steering unit, wherein the transmitting member is supported by a member which moves at the time of collision, and the steering wheel is moved forward by a predetermined distance by a retreating movement of the transmitting member.

According to the tenth aspect of the present invention, there is provided a steering structure of a vehicle comprising an operation detecting unit provided in a cabin for detecting an operation of a steering wheel by a crew member, a steering unit provided in an engine room for steering steered wheels, and a flexible transmitting member for connecting the operation detecting unit and the steering unit, wherein the transmitting member is supported by a member which moves at the time of collision, and a pedal is moved forward by a predetermined distance by a retreating movement of the transmitting member.

In the first aspect of the present invention, the operation of the steering wheel by a crew member is transmitted to the steered wheels through the operation detecting unit, the transmitting member and the steering unit, and the steered wheels are steered. If a load equal to or greater than the predetermined value is applied to the transmitting member from outside, the transmitting member is separated from a portion to be separated (to-be separated portion) provided on a portion of the transmitting member.

Therefore, even if the transmitting member is varied at the time of collision of the vehicle, there is an effect that the steering wheel angle is prevented from being varied, and the safety at the time of collision is enhanced.

In the second aspect of the present invention, in addition to the effect of the first aspect of the invention, the cutting member provided on a predetermined portion of the vehicle in correspondence with the transmitting member is retreated by the load from outside to cut (cut and separate) the transmitting member.

As a result, there is an effect that the cutting member can reliably cut the transmitting member at the time of collision of the vehicle.

In the third aspect of the present invention, when the supporting member for supporting the transmitting member at the predetermined portion of the vehicle body releases its support when the relative displacement between the supporting member and the transmitting member exceeds the predetermined value.

Therefore, the behavior of the transmitting member is absorbed by releasing the support at the time of collision, there is an effect that the steering wheel angle is prevented from being varied to enhance the safety at the time of collision.

In the fourth aspect of the present invention, in addition to the effect of any one of the first to the third aspect of the invention, the connected portion between the transmitting member and the operation detecting unit is disconnected by the relative displacement therebetween equal to or greater than the predetermined value.

As a result, there is an effect that even if the transmitting member behaves at the time of collision, the connected portion is separated, which prevents the steering wheel angle from being varied to enhance the safety at the time of collision.

In the fifth aspect of the present invention, in addition to the effect of any one of the first to the fourth aspect of the invention, the connected portion between the transmitting member and the steering unit is disconnected by the relative displacement therebetween equal to or greater than the predetermined value.

As a result, there is an effect that even if the transmitting member behaves at the time of collision, the connected portion is separated, which prevents the steering wheel angle from being varied to enhance the safety at the time of collision.

In the sixth aspect of the present invention, in addition to the effect of the fifth aspect of the invention, the transmitting member is connected from front of the steering unit so that if the steering unit is retreated by the load from outside, the connection between the steering unit and the transmitting member is disconnected. Therefore, there is an effect that it is easy to disconnect the connected portion of the transmitting member at the time of collision, and it is possible to further enhance the safety at the time of collision.

In the seventh aspect of the present invention, since the transmitting member is disposed with a predetermined deflection, there is an effect that even if the transmitting member behaves at the time of collision, the behavior is absorbed by the deflected portion, the steering wheel angle is not influenced, the transmitting member is not cut at the time of collision and thus, minimum running is ensured even at the time of accident.

In the eighth aspect of the present invention, in addition to the effect of the seventh aspect of the invention, the transmitting member comprises a pair of cables, the pair of cables are supported by the same member. Therefore, there is an effect that the pair of cables are reliably prevented from twisting at the time of collision.

In the ninth aspect of the present invention, the transmitting member is supported by a member which moves at the time of collision, and the steering wheel is moved forward by a predetermined distance by a retreating movement of the transmitting member.

Therefore, the transmitting member is not cut at the time of collision, minimum running is ensured even at the time of accident, and the safety at the time of collision is further enhanced by moving the steering wheel forward.

In the tenth aspect of the present invention, the transmitting member is supported by a member which moves at the time of collision, and a pedal is moved forward by a predetermined distance by a retreating movement of the transmitting member.

As a result, the transmitting member is not cut at the time of collision, minimum running is ensured even at the time of accident and a crew member's feet are not damaged, then the safety at the time of collision is further enhanced by moving the pedal forward.

DETAILED DESCRIPTION OF THE INVENTION

Figure 1:
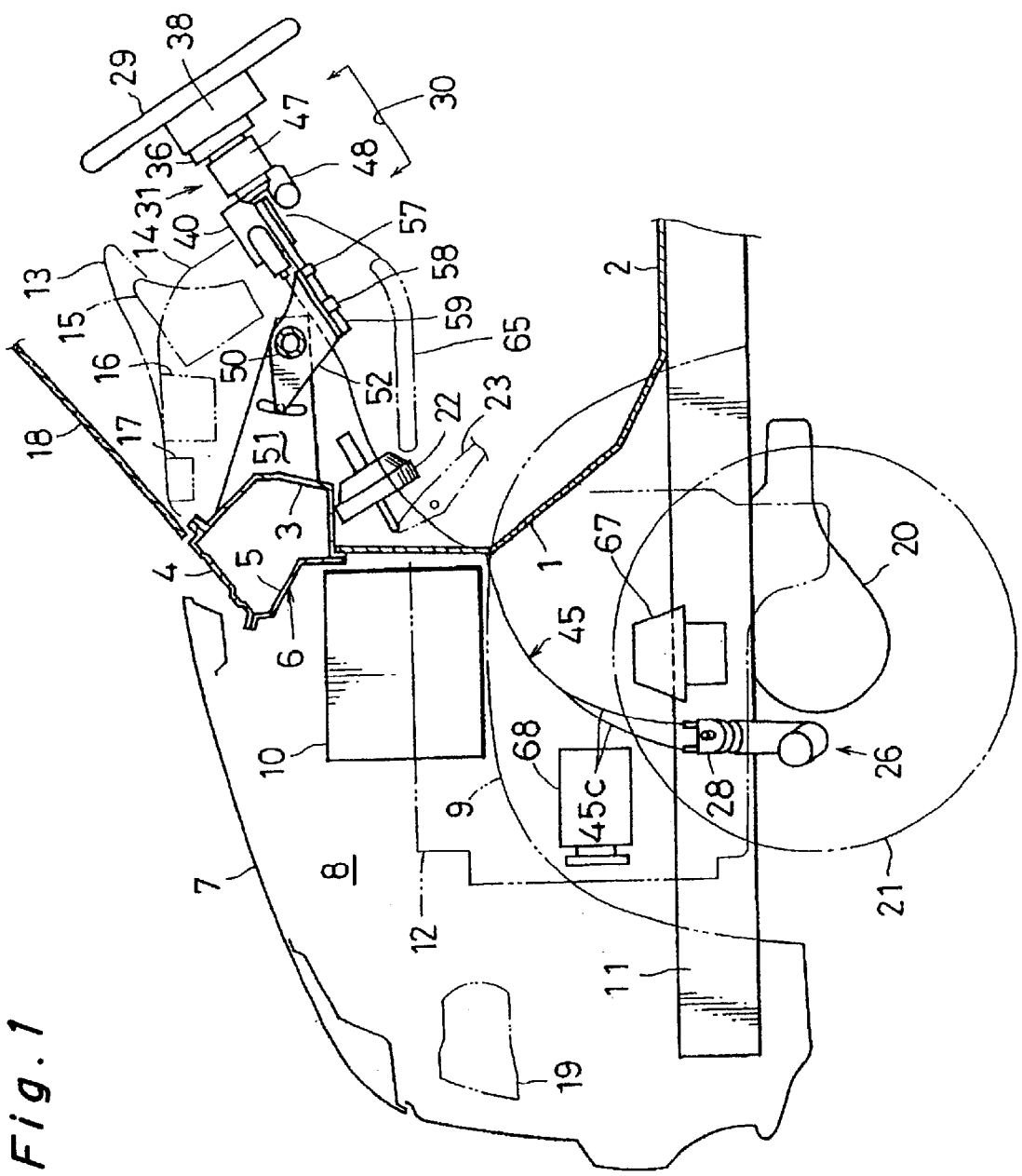
FIG. 1 is a side view showing a front body structure of a vehicle having a steering structure of the present invention.

An embodiment of the present invention will be described in detail based on the drawings.

The drawings show a steering structure of a vehicle. First, a front body structure of the vehicle will be briefly explained with reference to FIGS. 1 and 2.

A dash lower panel 1 is provided for partitioning an engine room and a cabin of the vehicle. A substantially horizontally extending floor panel 2 is connected to a lower end of the dash lower panel 1. A cowl box 6 extending in a widthwise direction of the vehicle is mounted to an upper end of the dash lower panel 1. The cowl box 6 comprises a dash upper panel 3, and a cowl upper panel 4 and a cowl lower panel 5.

In an engine room 8 whose upper portion is covered with a bonnet (hood) 7 such that the hood 7 can be opened and closed, a battery 10 is mounted on an upper portion of a tire house 9, and an engine 12 is mounted on a front-side frame 11 through an engine mount.

On the other hand, an instrument panel 14 having a meter hood 13 is provided in the cabin, and a meter 15, a vent duct 16 and a defroster duct 17 are disposed in the instrument panel 14.

Figure 2:
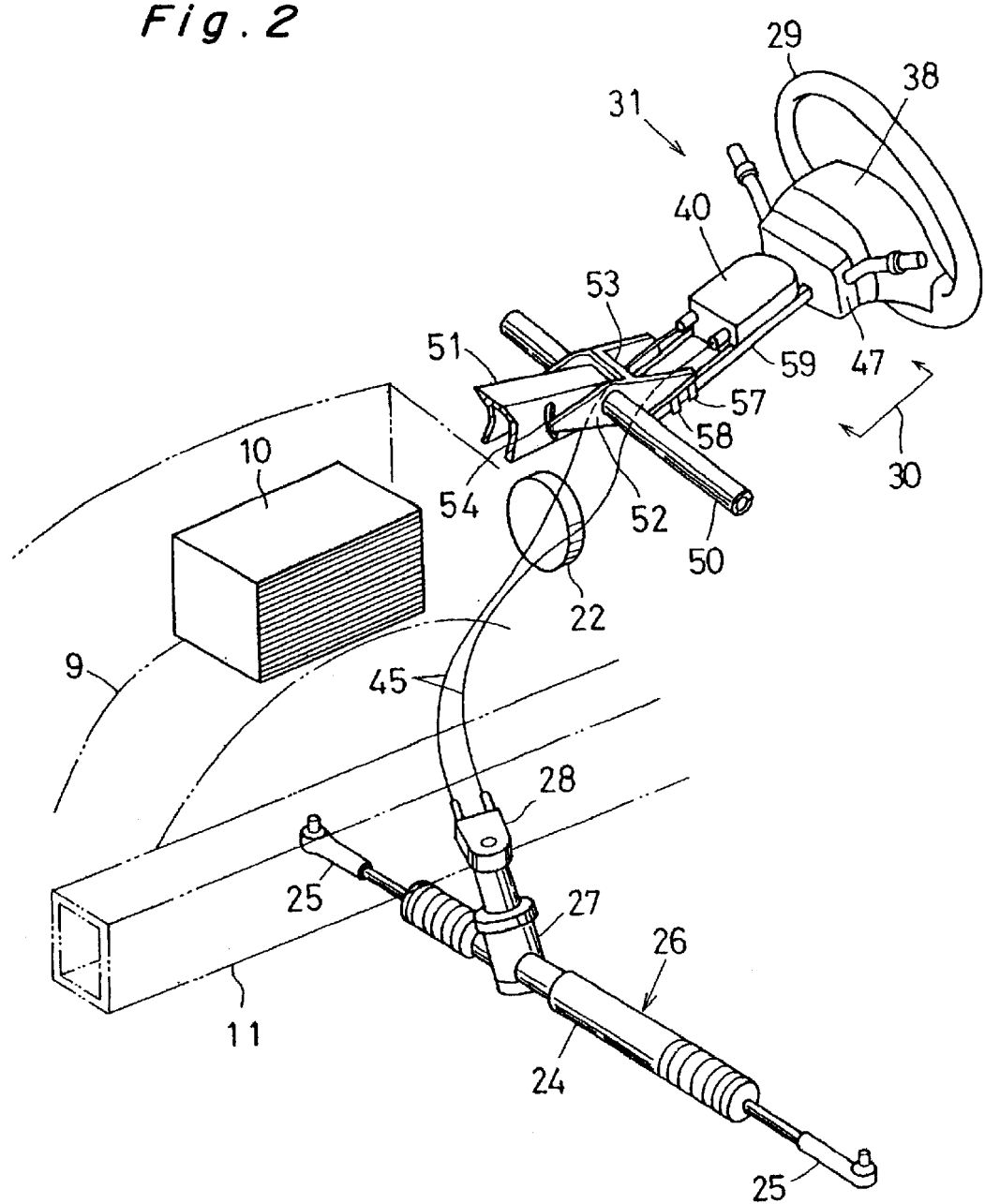
FIG. 2 is a schematic perspective view of an essential portion of FIG. 1.

In FIGS. 1 and 2, a numeral symbol 18 represents a front window glass, a numeral symbol 19 represents a head lamp, a numeral symbol 20 represents a front differential gear unit, a numeral symbol 21 represents front wheels as steered wheel, and a numeral symbol 22 represents a servo apparatus, i.e., a so-called master back (master cylinder) for converting a stepping force of a break pedal 23 into hydraulic pressure.

Next, referring to FIGS. 2, 3 and 4, the steering structure of the vehicle will be described.

A steering gear box 24 extending in a widthwise direction of the vehicle accommodates a rack and pinion. Tie rods 25,25 are connected to opposite ends of the rack to form a steering unit 26 for steering the front wheels 21. The steering unit 26 is disposed on a lower portion in the engine room 8.

The steering gear box 24 is integrally formed with a pinion holder 27. A pulley box 28 as a follower side cable operation unit is mounted to an upper portion of the pinion holder 27.

The pulley box 28 includes a follower pulley therein, and a rotation force of the follower pulley is transmitted to the pinion in the pinion holder 27.

Figure 4:
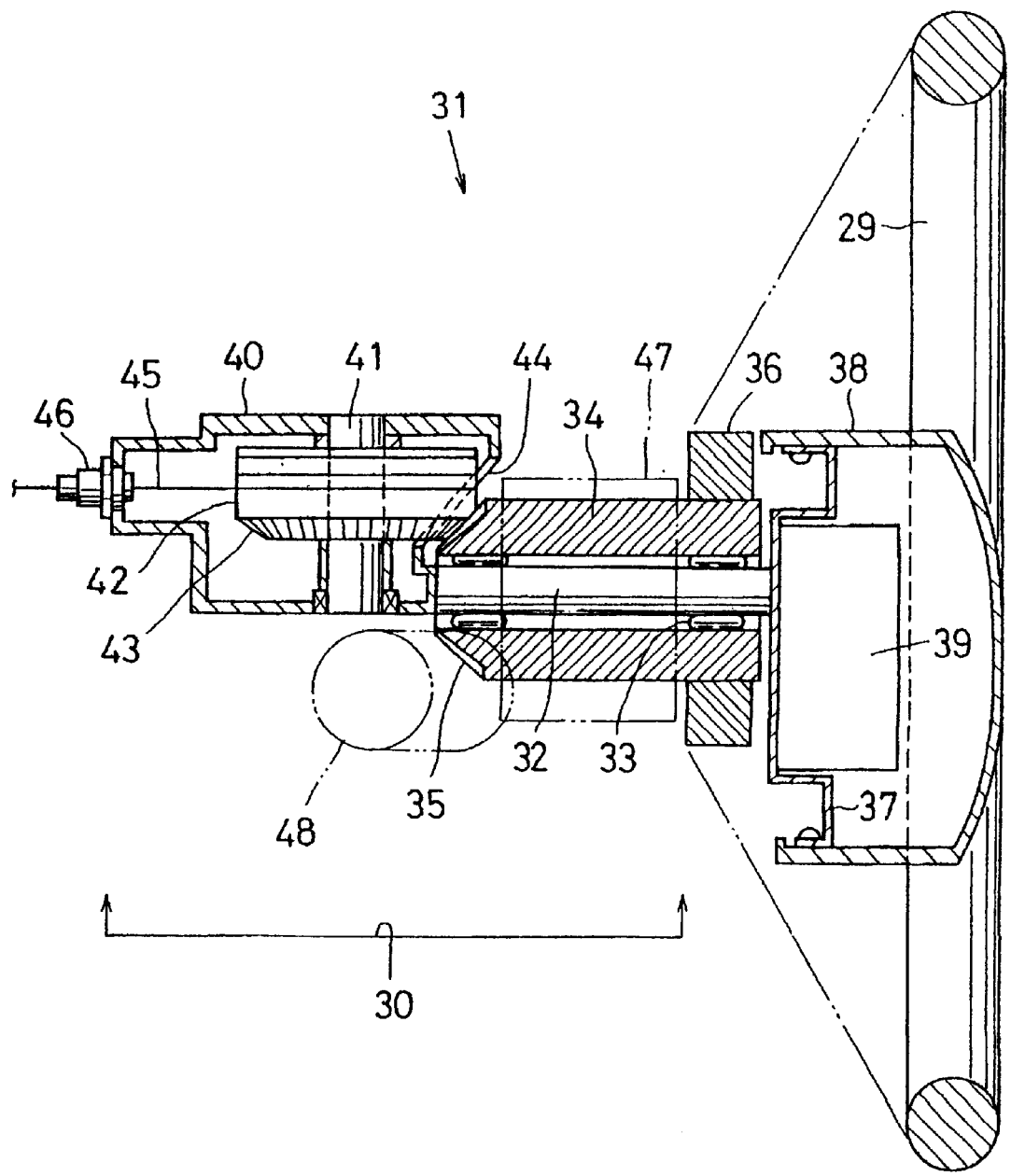
FIG. 4 is a sectional view of a steering operation unit of the vehicle of the invention.

On the other hand, as shown in FIG. 4, an operation detecting unit 30 is disposed in the cabin for detecting an operation of a steering wheel 29. Both the operation detecting unit 30 and the steering wheel 29 form a steering operation unit 31.

The steering operation unit 31 is constituted in the following manner.

That is, as shown in FIG. 4, a movable shaft 34 is provided on an outer periphery of a stationary shaft 32 through a bearing 33, and the movable shaft 34 is integrally formed with a driving bevel gear 35 at its lower end.

A column 36 is integrally connected to an outer periphery of an upper end of the movable shaft 34. A horn pad 38 is mounted to an upper end of the stationary shaft 32 through a base member 37. An air bag inflator 39 for an air bag apparatus is disposed on an upper face of the base member 37.

When the steering wheel 29 is operated, the column 36, the movable shaft 34 and the driving bevel gear 35 are turned while keeping a non-turning state of each of the elements 32 and 37 to 39.

A pulley box 40 as a cable operating unit is mounted to the stationary shaft 32. A driving pulley 42 is rotatably mounted in the pulley box 40 through a pulley shaft 41. The driving pulley 42 is integrally formed with a follower bevel gear 43.

A portion of the pulley box 40 is notched to form a notch 44, a portion of the follower bevel gear 43 is brought outside from the notch 44, and this brought out portion is meshed with the driving bevel gear 35.

Cables 45 as the flexible transmitting member are wound around the driving pulley 42 in the pulley box 40, and the cables 45 are brought out from the pulley box 40 through a cable guide 46.

The cables 45 are the transmitting member for connecting the driving pulley 42 in the pulley box 40 and the follower pulley in the pulley box 28 on the side of the steering unit 26. Each the cable 45 includes an outer tube and an inner cable. In the drawing, a numeral symbol 47 represents a combination switch, and a numeral symbol 48 represents a steering lock.

Next, a supporting structure of the steering operation unit 31 will be explained with reference to FIGS. 2, 3, 5 and 6.

Figure 3:
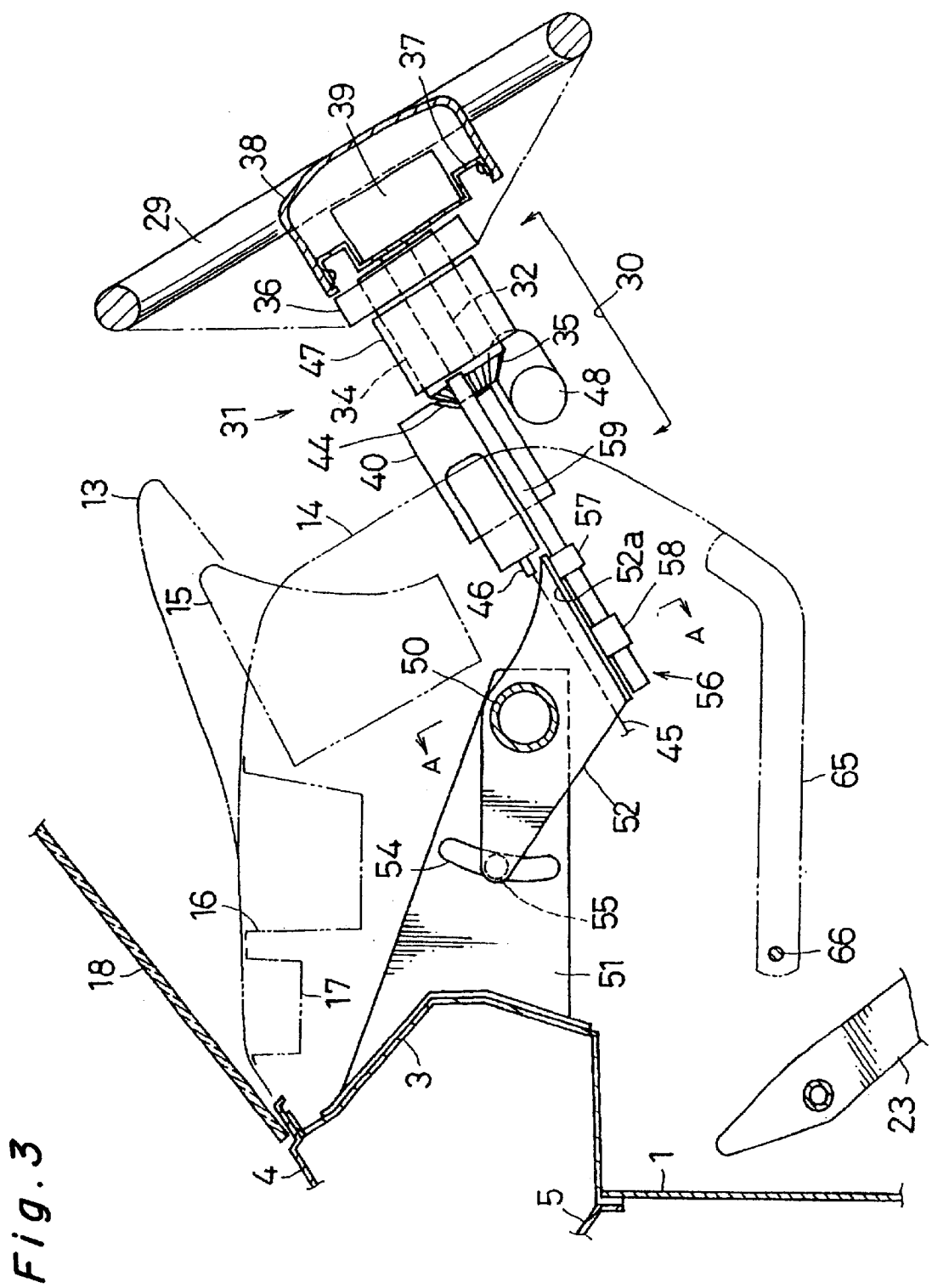
FIG. 3 is a side view showing the steering structure of the vehicle of the invention.

As shown in FIG. 3, a steering bracket 51 having a gate-like cross section is provided between a rear face of the dash upper panel 3 and a steering supporting member 50 (supporting portion on the vehicle side) as a reinforcing member extending in the widthwise direction of the vehicle.

The steering supporting member 50 is provided with a fixing bracket 52 which can turn around the steering supporting member 50. The fixing bracket 52 comprises two member located on left and right opposite outsides of the steering bracket 51, and a connecting plate 53 (see FIG. 2) integrally connecting the two members. The fixing bracket 52 is provided at its front end with a pin 55 (guide means) which is inserted into an arc-shaped guide groove 54 (guide means) formed on the steering bracket 51.

A slant rear end of the fixing bracket 52 is provided with a bent rail-mounting portion 52a. A slide rail 56 is mounted to the rail-mounting portion 52a.

Figure 5:
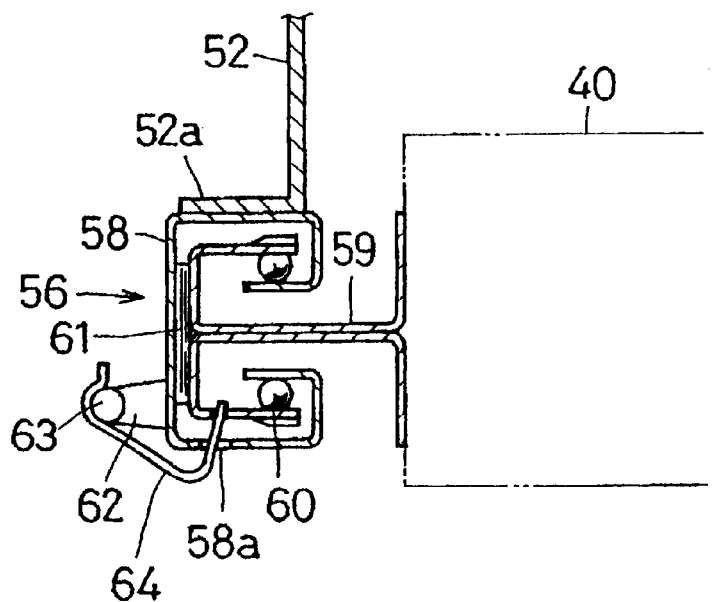
FIG. 5 is a sectional view taken along a line A—A in FIG. 3.
Figure 6:
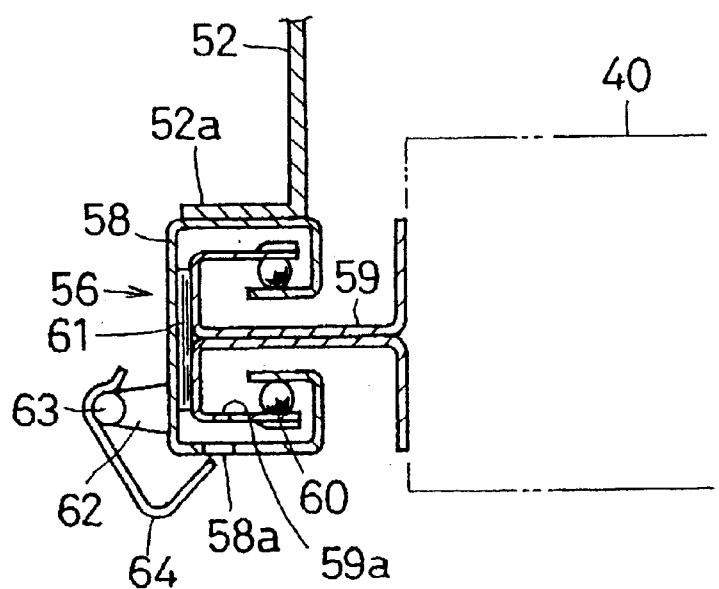
FIG. 6 is an explanatory drawing showing a lock-releasing state.

That is, the slide rail 56 comprises a plurality of stationary rails (so-called outer rails) 57, 58 fixed to the rail-mounting portion 52a, a movable rail (so-called inner rail) 59 which can slide along the stationary rails 57, 58, and balls 60 ad rollers 61 interposed between these rails. The pulley box 40 is fixed between the bilaterally symmetrically formed movable rails 59 and 59 as shown in FIGS. 5 and 6.

The stationary rail 58 is provided with a supporting shaft 63 through a projecting piece 62, and a lock lever 64 is mounted to the supporting shaft 63. The lock lever 64 is biased by a spring so that the lock lever 64 is always in engagement with locking holes 58a and 59a of the rails 58 and 59.

That is, the steering operation unit 31 can be vertically adjusted (tiltable) around a steering supporting member 50, and is supported such that the steering operation unit 31 can be adjusted in the longitudinal direction (capable of moving telescopically) by the slide rail 56.

In the drawing, a numeral symbol 65 represents a footrest (so-called ottoman) which is formed such that it can move up and down around a supporting shaft 66. The foot rest 65 is usually biased by a spring into an accommodated state as illustrated in the drawing, and when a crew member takes a rest and he or she desires to put his or her foot on the foot rest 65, it is turned in the clockwise direction shown in the drawing against the biasing force.

As shown in FIG. 1, the engine 12 is mounted on the front-side frame 11 through an engine mount rubber and an engine mount bracket 67. An alternator 68 (generator) is mounted on a side portion of the engine 12. The engine mount bracket 67 (rigidity member) and the alternator 68 are placed separately in the longitudinal direction of the vehicle and opposed to each other. Portions of the cables 45 are disposed such as to pass between both the members 67 and 68.

Figure 7:
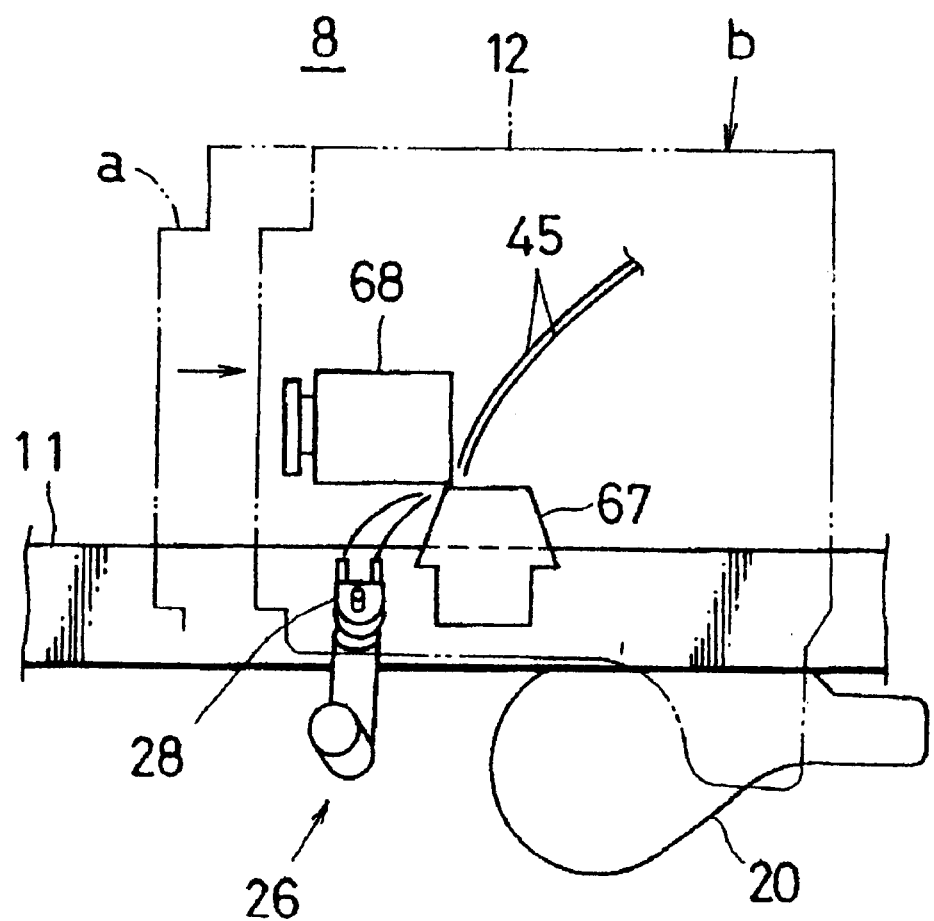
FIG. 7 is an explanatory drawing when a cable is cut by a cutting member.

That is, in this embodiment, the alternator 68 is set as the cutting member, and when the vehicle collides and a load equal to or greater than a predetermined value is input from outside, the alternator 68 is retreated together with the engine 12 as shown in FIG. 7, and a portion of each the cable 45 itself, i.e., a portion 45c of the cable 45 which is to be cut and separated (refer to as "a to-be separated portion 45c", hereinafter) of the cable 45 is cut and separated between the alternator 68 and the engine mount bracket 67.

The operation of the steering structure of a vehicle having the above-described design will be explained.

When the steering wheel 29 is turned, its operational force is transmitted to the follower bevel gear 43 on the side of the pulley box 40 through the column 36, the movable shaft 34 and the driving bevel gear 35 shown in FIG. 4. With this, the driving pulley 42 is rotated and thus, the rotation force is transmitted to the follower pulley in the pulley box 28 through the cable 45, and the front wheels 21 as the steered wheels can be steered through the steering unit 26 having the rack and the pinion.

When the vehicle collides (especially, head-on collision), the engine 12 and the alternator 68 are retreated from a normal position a in FIG. 7 as shown in a phantom line b in FIG. 7. The to-be separated portion 45c (see FIG. 1) of the cable passing between the alternator 68 and the engine mount bracket 67 is cut and separated by a rear sharp portion of the alternator 68 and the engine mount bracket 67 as a rigidity member as shown in FIG. 7.

Since the portion of the cable 45 itself is cut and separated at the time of collision in this manner, even if the cable 45 is retreated at the time of collision, the angle of the steering wheel 29 is not varied at all, and the safety at the time of collision is enhanced.

Especially, when an air bag apparatus is disposed in the steering wheel 29 as shown in FIG. 4, the air bag is developed in a desired direction to protect the crew member excellently.

According to the embodiment shown in FIGS. 1 to 7 (embodiment corresponding to the first and the second aspect of the present invention), the operational force of the steering wheel 29 by a crew member is transmitted to the steered wheels (see front wheels 21) through the operation detecting unit 30 and the transmitting member (see cable 45) and the steering unit 26, and the steered wheels (see front wheels 21) are steered. When the load equal to or greater than the predetermined value is applied to the transmitting member (see cable 45) from outside, the transmitting member (see cable 45) is cut and separated from the portion (see to-be separated portion 45c) provided on the part of the transmitting member (see cable 45).

Therefore, even if the front portion of the transmitting member (see cable 45) is retreated at the time of collision of the vehicle, the angle of the steering wheel 29 is not varied at all, and the safety at the time of collision is enhanced.

The cutting member (see alternator 68) provided in the predetermined portion (see side of the engine 12) of the vehicle in correspondence with the transmitting member (see cable 45) is retreated by the load (collision load) from outside to cut and separate the transmitting member (see cable 45).

As a result, there is an effect that it is possible to reliably cut and separate the transmitting member (see cable 45) by the cutting member (see alternator 68) at the time of collision.

Since the portion of the cable 45 is cut and separated at the time of collision by the engine mount bracket 67 and the alternator 68 as shown in the embodiment, the cable 45 can be cut effectively utilizing the existing parts.

Instead of the structure for cutting the cable 45 by the engine mount bracket 67 and the alternator 68, a member which retreats and a member which does not retreat at the time of collision may be respectively provided with a cutting blade and a receiving blade, and the cable 45 may be disposed such as to pass between the cutting blade and the receiving blade which are disposed at a distance from each other.

Further, instead of the structure for cutting the cable 45 at the time of collision, portions of the inner cable and outer tube may be connected to each other by a coupling, and the coupling may be cut and separated utilizing a force pulling the cable 45 by a load which is input at the time of collision, thereby separating the cable 45.

Figure 8:
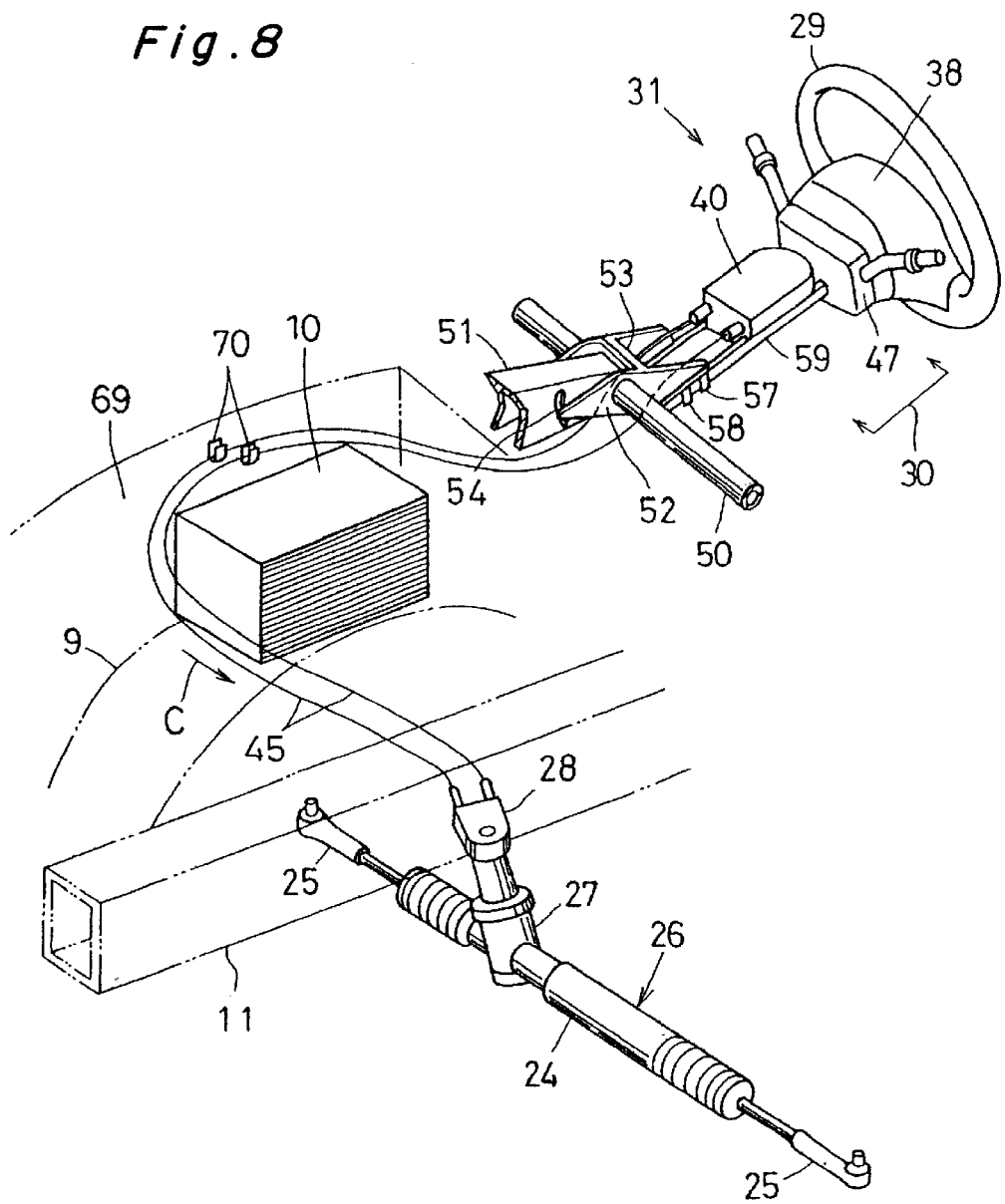
FIG. 8 is a perspective view showing another embodiment of the steering structure of the vehicle of the invention.
Figure 9:
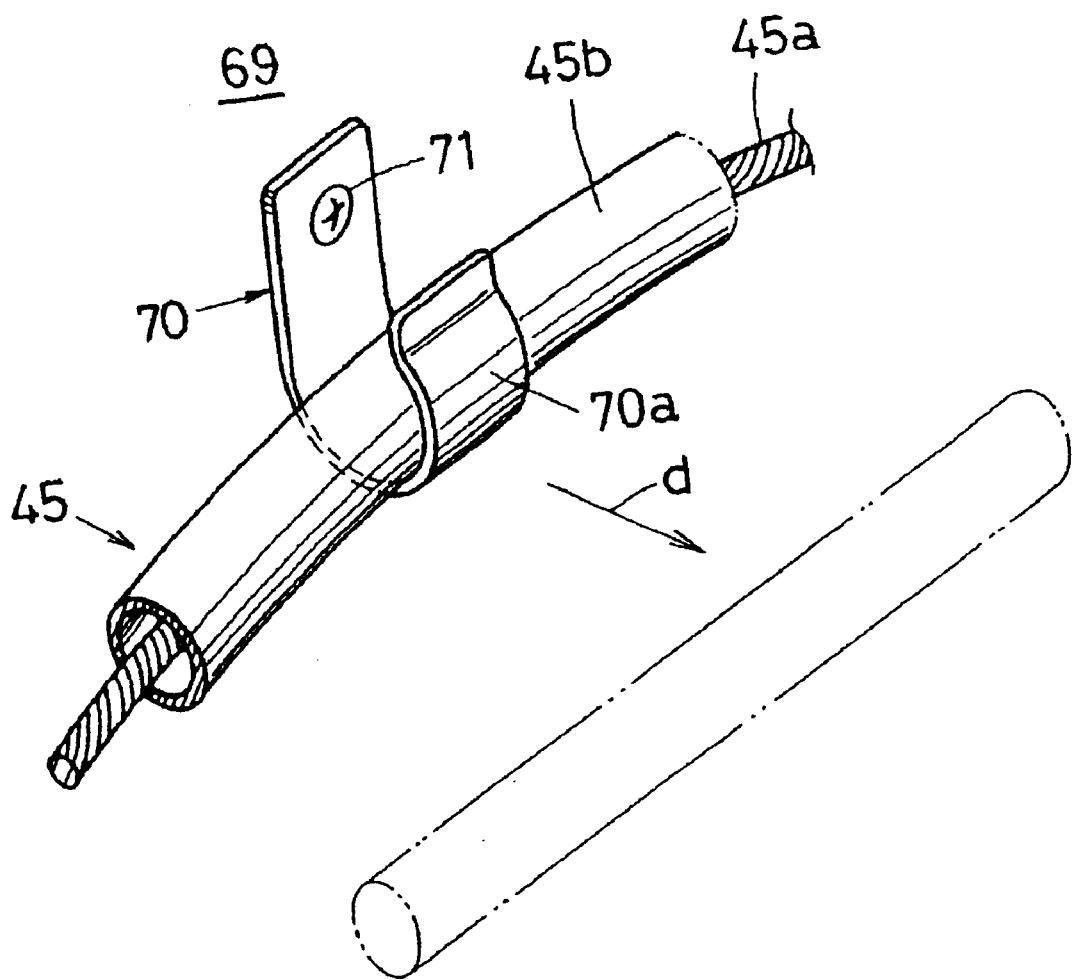
FIG. 9 is an enlarged perspective view of a supporting member in FIG. 8.

FIGS. 8 and 9 show another embodiment of the steering structure of a vehicle. Instead of the previous embodiment in which the pair of cables 45 and 45 are passed between the engine mount bracket 67 and the alternator 68, in the present embodiment shown in FIGS. 8 and 9, the pair of cables 45 and 45 are brought into the engine room 8 from the dash lower panel 1 and pulled toward a face of a wheel apron panel 69 on the side of the engine room 8, and the cables 45 are connected to the follower pulley in the pulley box 28 through a front portion of the battery 10.

Further, as shown in FIG. 9, the pair of cables 45 and 45 comprising inner cables 45a and outer tubes 45b are provided on cable holders 70 and 70 supported on the wheel apron panel 69, and the outer tubes 45b and 45b of the pair of cables 45 and 45 are supported by the cable holders 70 and 70.

Each the cable holders 70 and 70 includes a cable holding portion 70a formed into a substantially U-shape. The cable holder 70 is a supporting member fixed to the wheel apron panel 69 using a mounting member 71 such as a screw, a clip and a bolt. The cable holders 70 and 70 release the supporting of the cables between the cable holders 70 and 70 and the wheel apron panel 69 when a relative displacement between the cable holders 70 and 70 and the cables 45 and 45.

That is, if the engine 12 and steering unit 26 are retreated at the time of collision of the vehicle, a front portion of each the cable 45 is pulled into a direction shown with an arrow c in FIG. 8. The portion of the cable 45 supported by the cable holder 70 comes out from the cable holder 70 as shown with an arrow d in FIG. 9, so as to prevent a variation in the angle of the steering wheel 29 which is caused by a behavior of the cable 45.

As described above, according to the embodiment shown in FIGS. 8 and 9 (embodiment corresponding to the third aspect of the present invention), the supporting member (see cable holder 70) supporting the transmitting member (see cable 45) to the predetermined portion (see wheel apron panel 69) of the vehicle body release the support when the relative displacement between the supporting member and the transmitting member (see cable 45).

Therefore, there is an effect that since the behavior of the transmitting member (see cable 45) at the time of collision is absorbed by the release of the support, and the angle of the steering wheel 29 is prevented from being varied to enhance the safety at the time of collision.

Other structure, operation and effect of this embodiment shown in FIGS. 8 and 9 are substantially the same as those of the previous embodiment, elements similar to those shown in the previous embodiment are designated by the same reference numerals in FIGS. 8 and 9, and detailed explanation thereof will be omitted.

Figure 10:
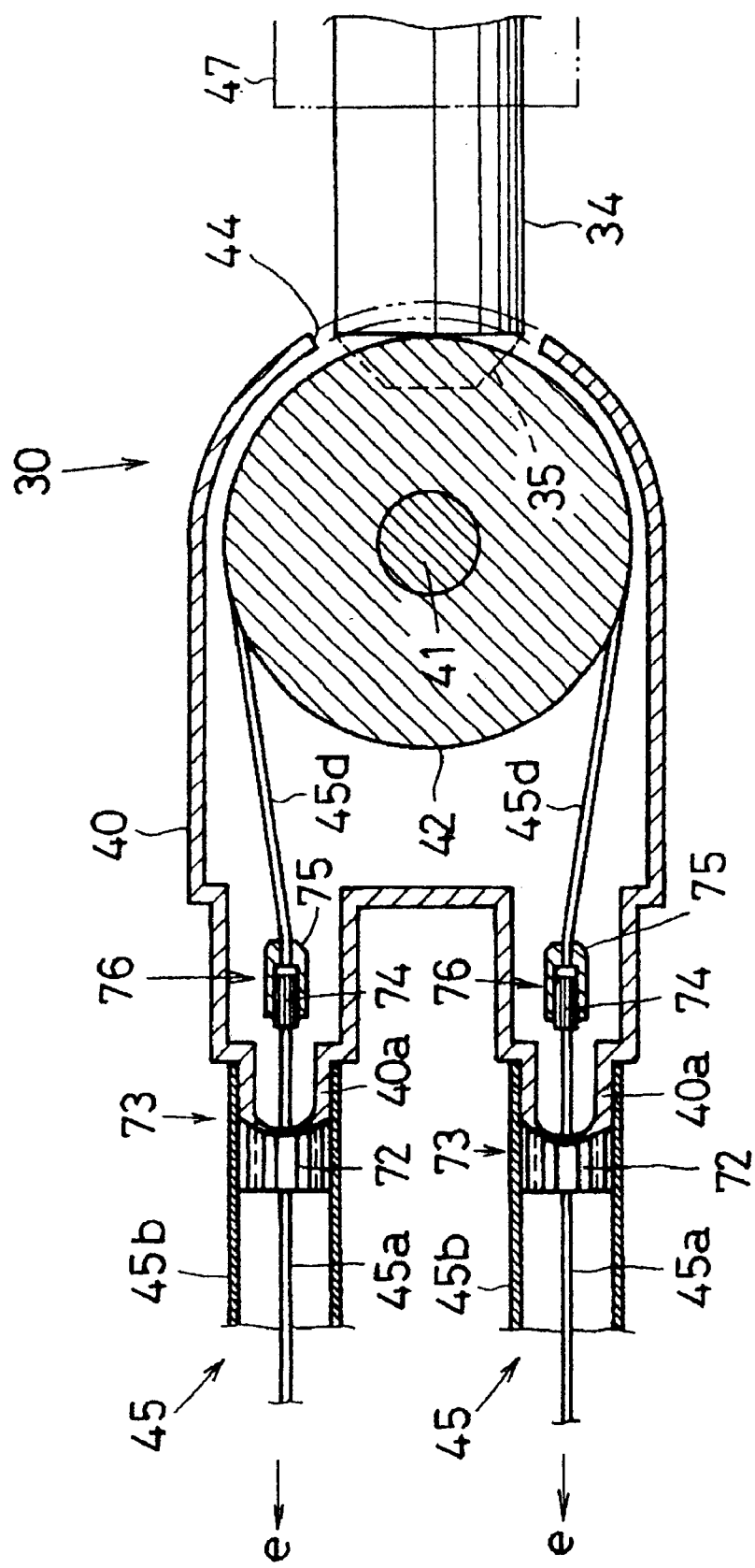
FIG. 10 is a sectional view showing another embodiment of the steering structure of the vehicle of the invention.
Figure 11:
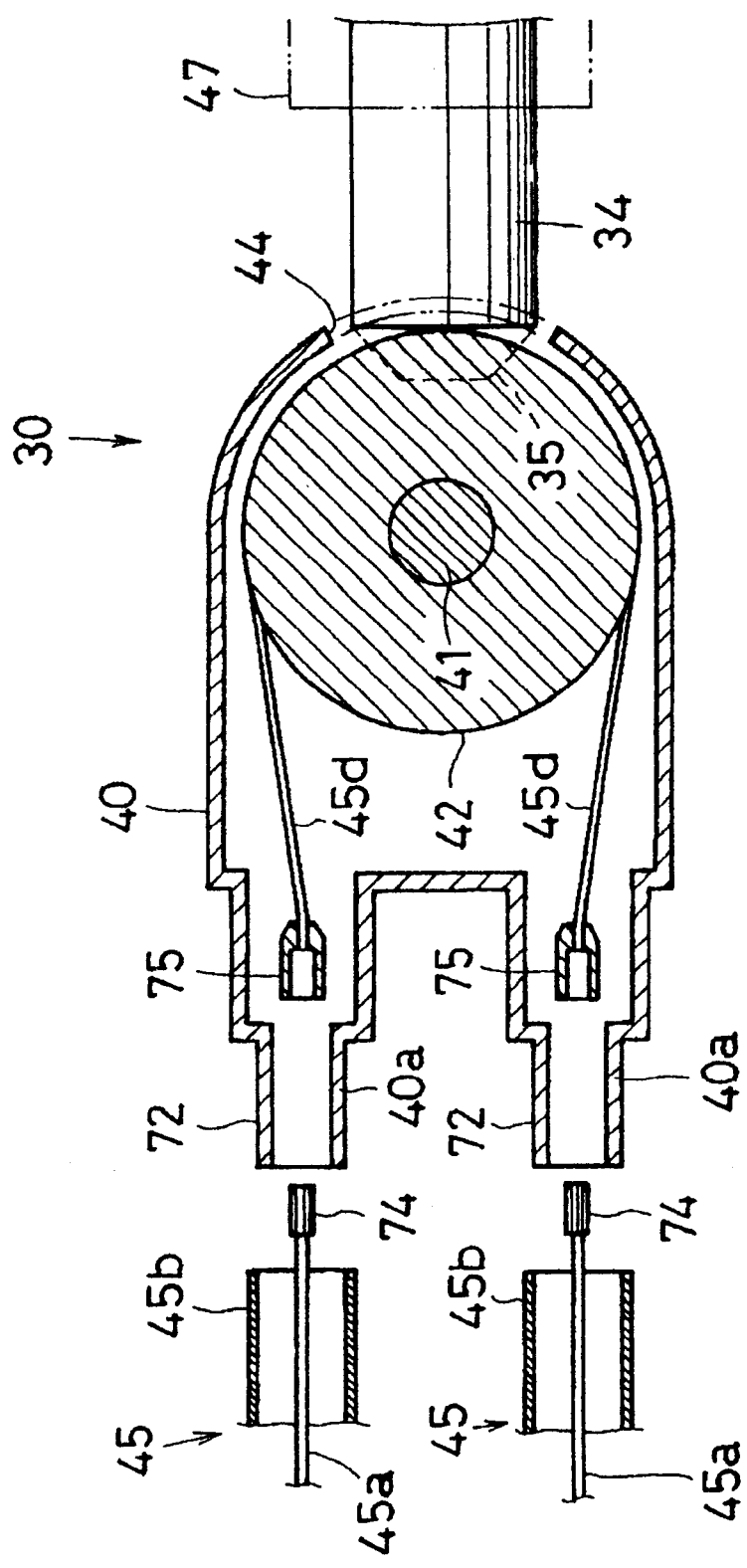
FIG. 11 is a sectional view showing a separating state of a connected portion.

FIGS. 10 and 11 shows another embodiment of the steering structure of a vehicle.

In the embodiment shown in FIGS. 10 and 11, connected portions between the pair of cables 45 and 45 and the operation detecting unit 30 are arranged to be disconnected by the relative displacement of these elements 45 and 30 equal to or greater than a predetermined value.

That is, outer peripheries of two cable guide cylinders 40a and 40a which are projected forward from the pulley box 40 are integrally formed with a plurality of projections and recesses 72 which are extended in an axial direction of the cylinder. The outer tubes 45b and 45b are mounted to the projections and recesses 72 such that they are disconnected when a load equal to or greater than a predetermined value is applied, thereby constituting connected portions 73 and 73.

The pair of inner cables 45a are divided in the longitudinal direction, the front side divided inner cables 45a are provided at their rear ends with sleeves 74 and 74 (so-called pushing sleeves), and the outer surfaces of the sleeves 74 and 74 are formed with a plurality of projections and recesses extending in an axial direction of the sleeve. The rear side divided inner cables 45d are provided at their front ends with receiving members 75, to which the sleeves 74 and 74 are fitted. The sleeves 74 are fitted to the receiving members 75, under pressure, and the divided front inner cables 45a and the rear inner cables 45d are connected to each other to form connected portions 76.

Furthermore, the connected portions 76 are designed such that they are disconnected when a load equal to or greater than the predetermined value is applied to the divided front inner cables 45a.

With this arrangement, at the time of collision of the vehicle, the engine 12 and the steering unit 26 (see the previous drawings) are retreated, and with this movement, the front portions of the cables 45 and 45 are retreated, a force equal to or greater than a predetermined value in a direction pulling the cables 45 and 45 forward is applied to each of the connected portions 73 and 76 of the cables 45 and 45 as shown with an arrow e in FIG. 10.

As a result, each the outer tube 45b is disengaged from the projections and recesses 72 of the pulley box 40, each the sleeve 74 of the front inner cable 45a is disengaged from the receiving member 75, and the connected portions 73 and 76 are cut and separated as shown in FIG. 11. Therefore, a variation in the angle of the steering wheel 29 which is caused by a behavior of the cable 45 is prevented.

As described above, according to the embodiment shown in FIGS. 10 and 11 (embodiment corresponding to the fourth aspect of the present invention), the connected portions 73 and 76 between the transmitting member (see cable 45) and the operation detecting unit 30 are disconnected by the relative displacement of both the elements 30 and 45 equal to or greater than the predetermined value.

As a result, there is an effect that even if the transmitting member (see cable 45) behaves at the time of collision, a variation in the angle of the steering wheel 29 is prevented by the separation of the connected portions 73 and 76, and the safety at the time of collision can be enhanced.

Figure 12:
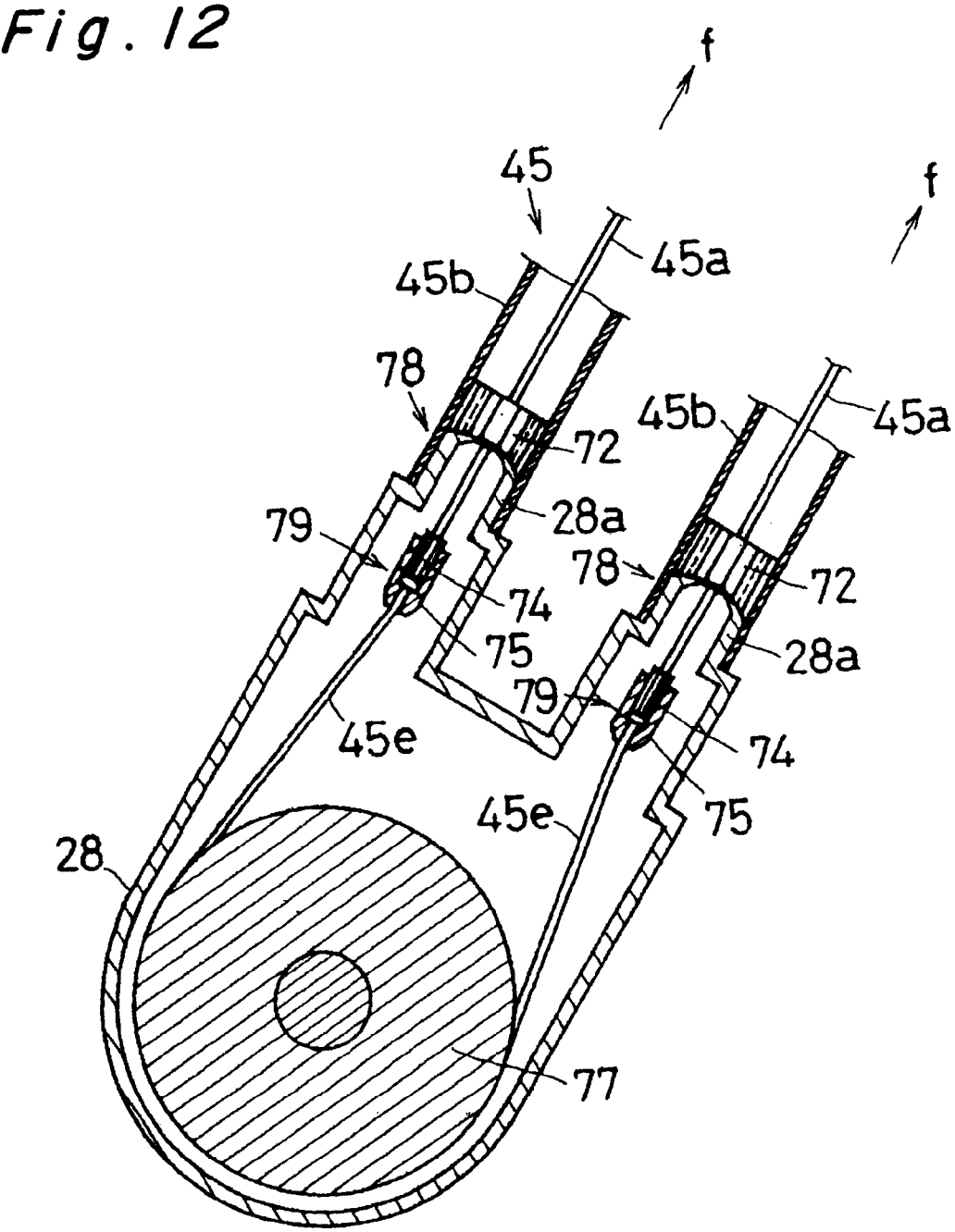
FIG. 12 is a sectional view showing another embodiment of the steering structure of the vehicle of the invention.

FIG. 12 shows another embodiment of the steering structure of a vehicle.

In the embodiment shown in FIG. 12, the connected portions between the pair of cables 45 and 45 and the steering unit 26 are disconnected by a relative displacement between both the elements 45 and 26 equal to or greater than a predetermined value.

That is, two cable guide cylinders 28a and 28a project outward from the pulley box 28 in which the follower pulley 77 is provided. The cable guide cylinders 28a and 28a are integrally formed at their outer peripheries with a plurality of projections and recesses 72 extending in an axial direction of the cylinder. The outer tubes 45b and 45b are mounted to the projections and recesses 72 such that they are disconnected when a load equal to or greater than a predetermined value is applied, thereby constituting connected portions 78 and 78.

The pair of inner cables 45a are divided in the longitudinal direction, one side divided inner cables 45a are provided at their divided ends with sleeves 74 and 74 (so-called pushing sleeves), and the outer surfaces of the sleeves 74 and 74 are formed with a plurality of projections and recesses extending in an axial direction of the sleeve. The other side divided inner cables 45e are provided at their divided ends with receiving members 75, to which the sleeves 74 and 74 are fitted. The sleeves 74 are fitted to the receiving members 75, under pressure, and the one side divided inner cables 45a and the other side inner cables 45e are connected to each other to form connected portions 79.

Furthermore, the connected portions 79 are designed such that they are disconnected when a load equal to or greater than the predetermined value is applied to the divided front inner cables 45a and 45a.

With this arrangement, at the time of collision of the vehicle, the engine 12 and the steering unit 26 (see the previous drawing) are retreated, and with this movement, the front portions of the cables 45 and 45 are retreated, a force equal to or greater than a predetermined value in a direction pulling the cables 45 and 45 is applied to each of the connected portions 78 and 79 of the cables 45 and 45 as shown with an arrow f in FIG. 12.

As a result, each the outer tube 45b is disengaged from the projections and recesses 72 of the pulley box 28, each the sleeve 74 of the one side inner cable 45a is disengaged from the receiving member 75, and the connected portions 78 and 79 are cut and separated. Therefore, a variation in the angle of the steering wheel 29 which is caused by a behavior of the cable 45 is prevented.

As described above, according to the embodiment shown in FIG. 12 (embodiment corresponding to the fifth aspect of the present invention), the connected portions 78 and 79 between the transmitting member (see cable 45) and the steering unit 26 are disconnected by the relative displacement of both the elements 26 and 45 equal to or greater than the predetermined value.

As a result, there is an effect that even if the transmitting member (see cable 45) behaves at the time of collision, a variation in the angle of the steering wheel 29 is prevented by the separation of the connected portions 78 and 79, and the safety at the time of collision can be enhanced.

Figure 13:
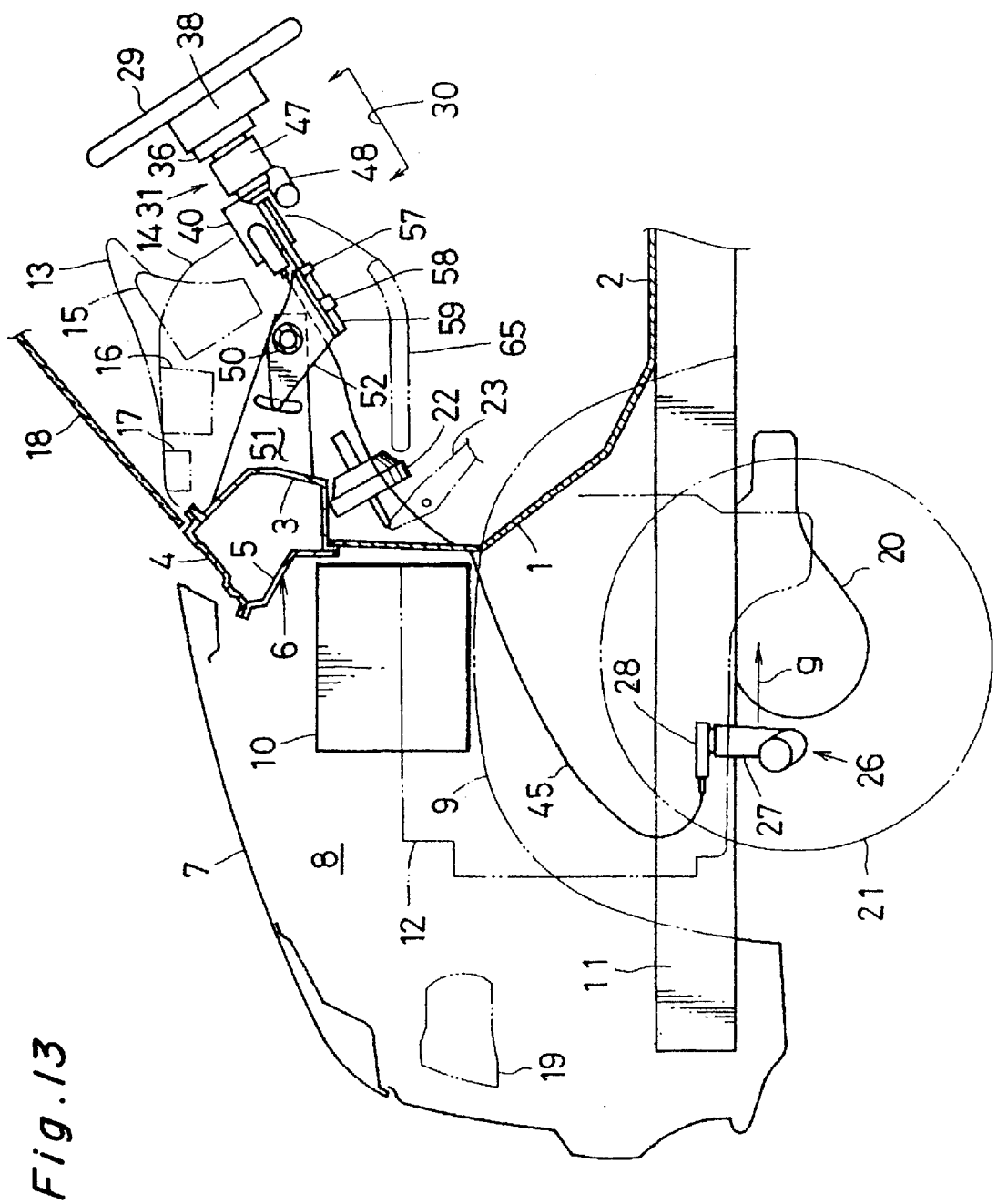
FIG. 13 is a side view showing another embodiment of the steering structure of the vehicle of the invention.
Figure 14:
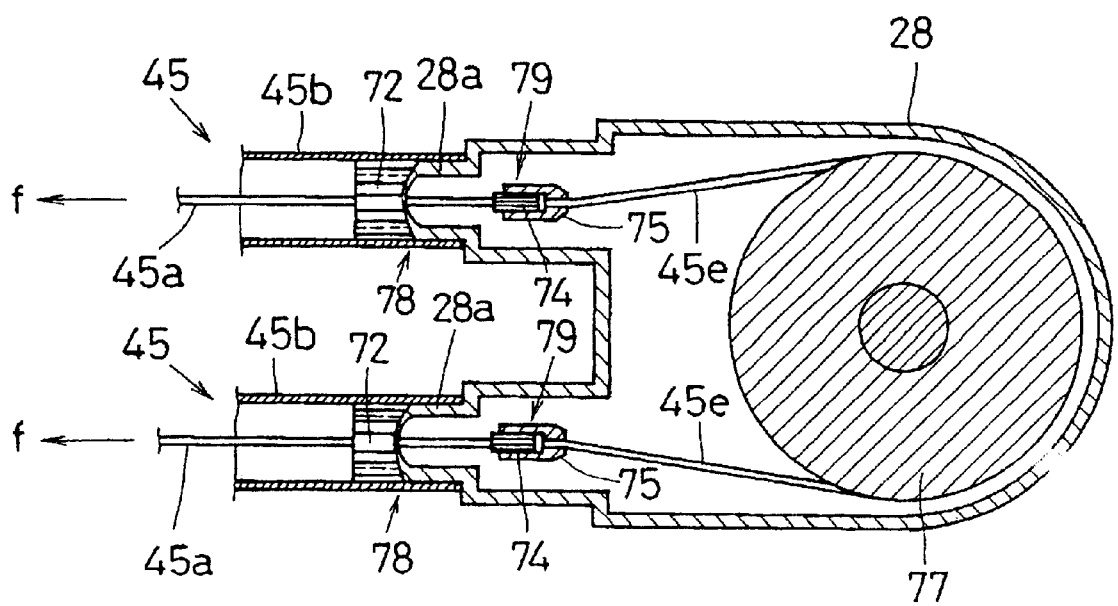
FIG. 14 is a enlarged cross-sectional view of an essential portion of FIG. 13.

FIGS. 13 and 14 show another embodiment of the steering structure of a vehicle. The pair of cables 45 and 45 are connected from front of the steering unit 26, and the connected portions 78 and 79 between the steering unit 26 and the pair of cables 45 and 45 are disconnected by a retreating movement of the steering unit 26 caused by a load from outside.

That is, in the present embodiment shown in FIGS. 13 and 14, the disposition of the pulley box 28 is changed from the previous drawing FIG. 12, and as shown in FIGS. 13 and 14, the pair of cable guide cylinders 28a and 28a are disposed such as to project forward of the vehicle from the pulley box 28 mounted on the upper portion of the pinion holder 27, and the outer tubes 45b and the divided one side inner cables 45a are connected to the connected portions 78 and 79 from front.

In this manner, according to the embodiment shown in FIGS. 13 and 14 (embodiment corresponding to the sixth aspect of the present invention), the transmitting member (see cable 45) is connected from front of the steering unit 26 such that the connected portions 78 and 79 between the steering unit 26 and the transmitting member (see cable 45) are disconnected by the retreating movement (retreating movement into a direction of an arrow g in FIG. 13) of the steering unit 26 caused by a load (collision load) from outside. Therefore, there is an effect that it is easy to disconnect the connection of the transmitting member (see cable 45) at the time of collision, and it is possible to further enhance the safety at the time of collision.

A portion in the vicinity of the pulley box 28 in the cables 45 and 45 is held by a member which is not retreated at the time of collision by holding means (not shown).

Other structure, operation and effect of this embodiment shown in FIGS. 13 and 14 are substantially the same as those of the previous embodiment, elements similar to those shown in the previous embodiment are designated by the same reference numerals in FIGS. 13 and 14, and detailed explanation thereof will be omitted.

FIGS. 15 to 19 show another embodiment of the steering structure of a vehicle.

Figure 15:
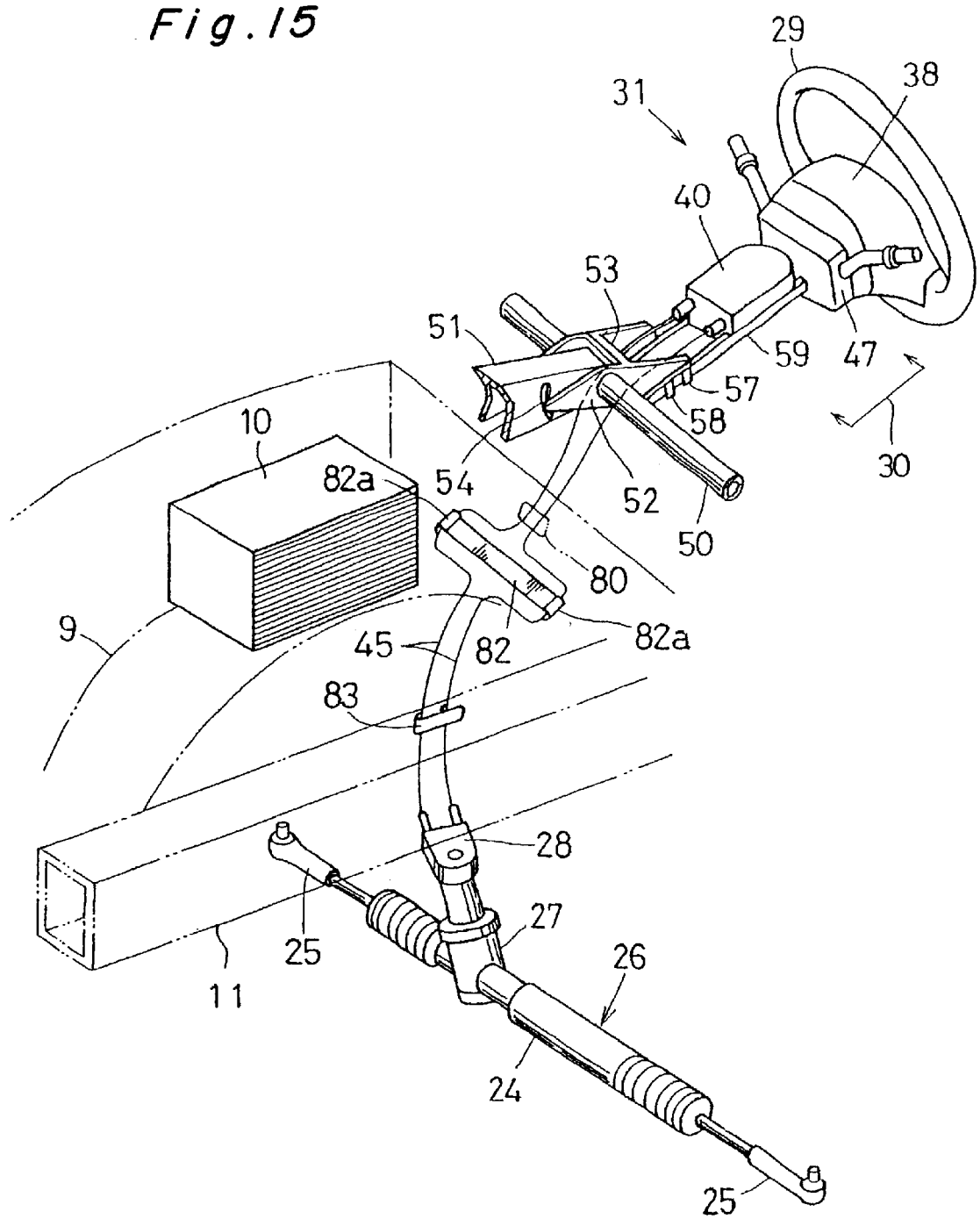
FIG. 15 is a perspective view showing another embodiment of the steering structure of the vehicle of the invention.
Figure 16:
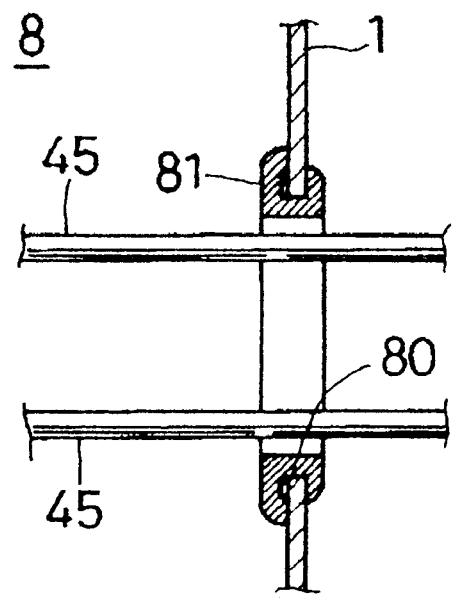
FIG. 16 is an enlarged sectional view showing a relation between a dash lower panel and the cable.

In this embodiment, as shown in FIGS. 15 and 16, the dash lower panel 1 is formed with a cable through hole 80, and a grommet 81 is mounted to the cable through hole 80 as a protecting ring. The pair of cables 45 and 45 are pulled out from the cabin into the engine room 8 through an opening of the grommet 81.

Further, the pair of cables 45 and 45 pulled out toward the engine room 8 are held at a distance from each other using a cable holder 82 made of synthetic resin or thin metal plate, and the pair of cables 45 and 45 are disposed with predetermined deflection (dimensional margin).

Figure 17:
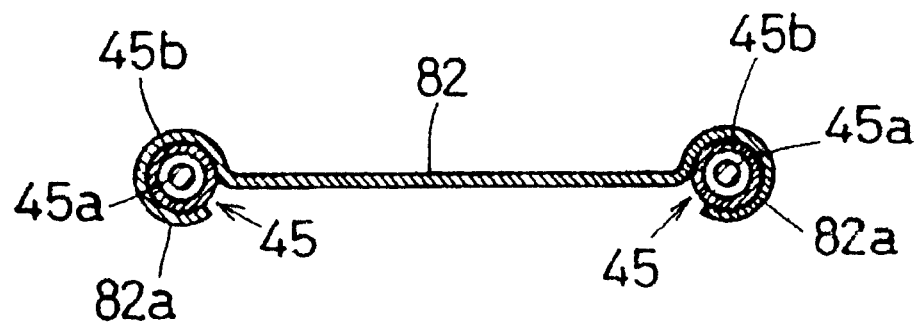
FIG. 17 is an enlarged sectional view showing a relation between a cable holder and the cable.

As shown in FIGS. 15 and 17, the cable holder 82 is provided at its left and right opposite ends with cable holding portions 82a and 82a. The cable holder 82 holds the outer tubes 45b and 45b of the pair of cables 45 and 45, and the pair of cables 45 and 45 are disposed at a predetermined distance from each other in the widthwise direction of the vehicle.

The pair of cables 45 and 45 are disposed with predetermined deflection by the cable holder 82, and tip ends of the cables 45 and 45 are connected to the pulley box 28. Portions of the pair of cables 45 and 45 between the cable holder 82 and the pulley box 28 are disposed on right side of the engine 12, and the pair of cables 45 and 45 in this portions are supported on right side faces of the engine 12 using a cable holder 83 shown in FIG. 18.

Figure 18:
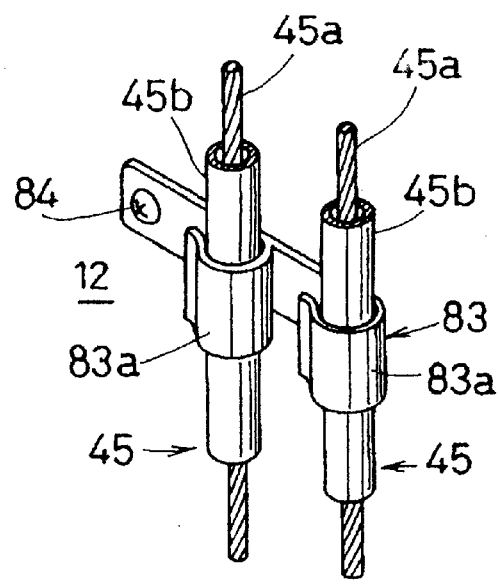
FIG. 18 is a perspective view showing the relation between the cable holder and the cable.

As shown in FIG. 18, this cable holder 83 includes cable holding portions 83a and 83a for holding the outer tubes 45b and 45b of the pair of cables 45 and 45 at a distance from each other. The cable holder 83 is supporting means that support the pair of cables 45 and 45 to the engine 12 as the same member which is retreated at the time of collision.

The cable holder 83 is a supporting member fixed to the side face of the engine 12 using a mounting member 84 such as a screw, a clip and a bolt.

Figure 19:
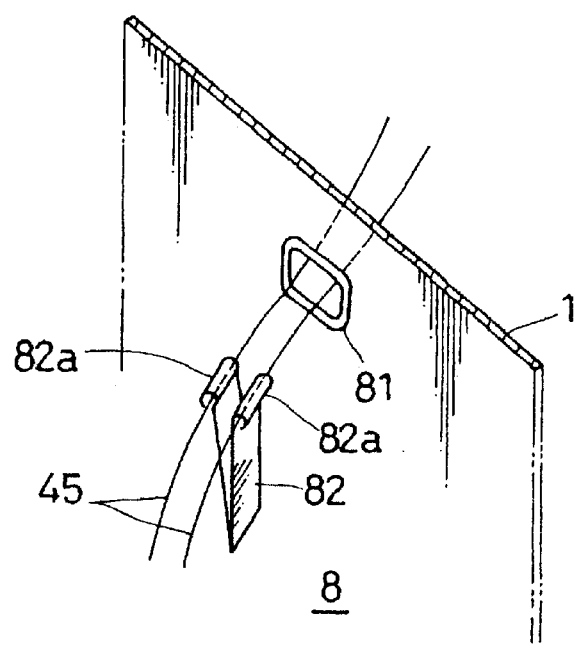
FIG. 19 is an explanatory diagram showing a bending state of the cable holder at the time of collision.

With this structure, when the vehicle collides, the steering unit 26 and the engine 12 are retreated, and a force for pulling the cables 45 and 45 forward is applied to the cables 45 and 45 at the front portion of the cable holder 82. With this pulling force, the cable holder 82 made of synthetic resin or thin metal plate is bent as shown in FIG. 19, the original predetermined deflection degree is reduced to absorb the behavior of the cables 45 and 45. Therefore, a variation in the angle of the steering wheel 29 which is caused by a behavior of the cable 45 is prevented.

As described above, according to the embodiment shown in FIGS. 15 to 19 (embodiment corresponding to the seventh and the eighth aspects of the present invention), since the transmitting member (see cable 45) is disposed with a predetermined deflection (dimensional margin), there is an effect that even if the transmitting member (see cable 45) behaves at the time of collision, the behavior is absorbed by the deflected portion (portions separated away at a distance by the cable holder 82), the steering wheel angle is not influenced, the transmitting member (see cable 45) is not cut at the time of collision and thus, minimum running is ensured even at the time of accident.

Further, the transmitting member comprising the pair of cables 45 and 45 is supported by the same member (see the engine 12 which is retreated at the time of collision of the vehicle), there is an effect that the pair of cables 45 and 45 are reliably prevented from twisting at the time of collision.

Other structure, operation and effect of this embodiment shown in FIGS. 15 to 19 are substantially the same as those of the previous embodiments, elements similar to those shown in the previous embodiments are designated by the same reference numerals in FIGS. 15 to 19, and detailed explanation thereof will be omitted.

Figure 20:
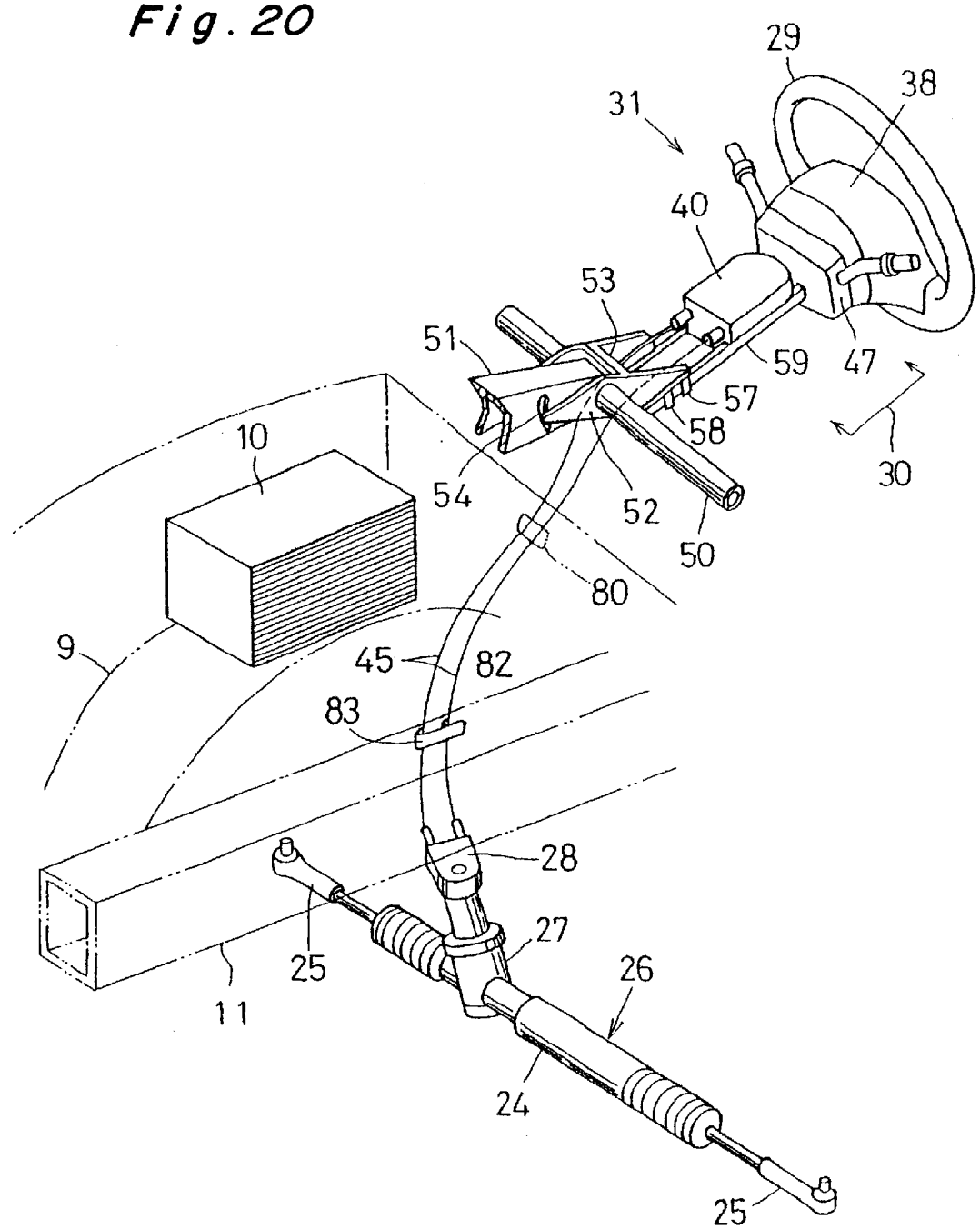
FIG. 20 is a perspective view showing another embodiment of the steering structure of the vehicle of the invention.
Figure 21:
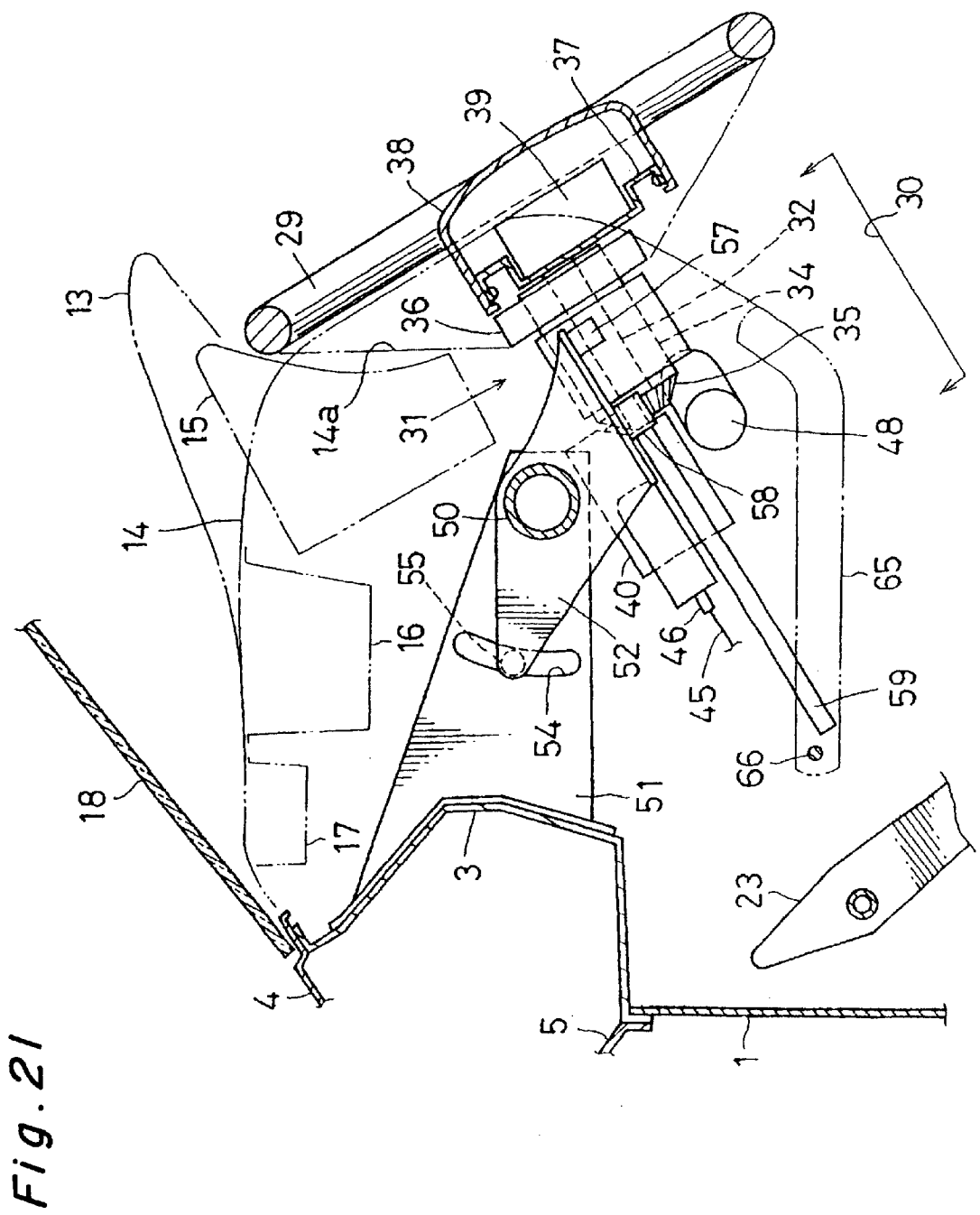
FIG. 21 is a side view showing a forward movement of a steering wheel of the invention.

FIGS. 20 and 21 show another embodiment of the steering structure of a vehicle.

In this embodiment, the pair of cables 45 and 45 are supported by a member which is retreated at the time of collision, i.e., the engine 12 using the cable holder 83 shown in FIG. 18. By retreating the cables 45 and 45, the steering wheel 29 is moved forward by a predetermined distance.

That is, in the embodiment shown in FIGS. 20 and 21, the deflection caused by the cable holder 82 is eliminated, and the lock lever 64 shown in FIGS. 5 and 6 is made of material such as synthetic resin which is broken when an impact equal to or greater than a predetermined value is applied.

With this structure, when the vehicle collides, the steering unit 26 and the engine 12 are retreated, and a force for pulling the cables 45 and 45 forward is applied to the cables 45 and 45, and the lock lever 64 is broken by this force and the lock of the movable rails 59 is released. Therefore, the steering wheel 29 is moved forward by the predetermined distance along the slide rail 56 as shown in FIG. 21.

When the steering wheel 29 moves forward of the vehicle, a lower face of the steering wheel 29 and a part of surface of the instrument panel 14 substantially contact to each other and the instrument panel 14 is formed with a recess 14a having a corresponding shape.

At the time of collision, the air bag of the air bag apparatus provided in the steering wheel 29 is developed. The air bag can be developed largely because the steering wheel 29 moves forward. With this design, an impact absorbing performance of the air bag, i.e., a protecting performance of the crew member can be enhanced.

The lock lever 64 may be made of metal instead of synthetic resin, and the thickness thereof may be made thinner. The lock lever 64 also may be provided with a notch so that the lock lever 64 can be broken without hindering the diagonally downward movement of the movable rails 59.

As described above, according to the embodiment shown in FIGS. 20 and 21 (embodiment corresponding to the ninth aspect of the present invention), the transmitting member (see cable 45) supported by the member (see engine 12) which moves at the time of collision is retreated to move the steering wheel 29 forward by the predetermined distance.

Therefore, the transmitting member (see cable 45) is not cut at the time of collision, and the minimum running of the vehicle is ensured even at the time of collision. Further, since the steering wheel 29 is moved forward by the transmitting member (see cable 45), there is an effect that the safety at the time of collision can be further enhanced.

Other structure, operation and effect of this embodiment shown in FIGS. 20 and 21 are substantially the same as those of the previous embodiments, elements similar to those shown in the previous embodiment are designated by the same reference numerals in FIGS. 20 and 21, and detailed explanation thereof will be omitted.

Figure 22:
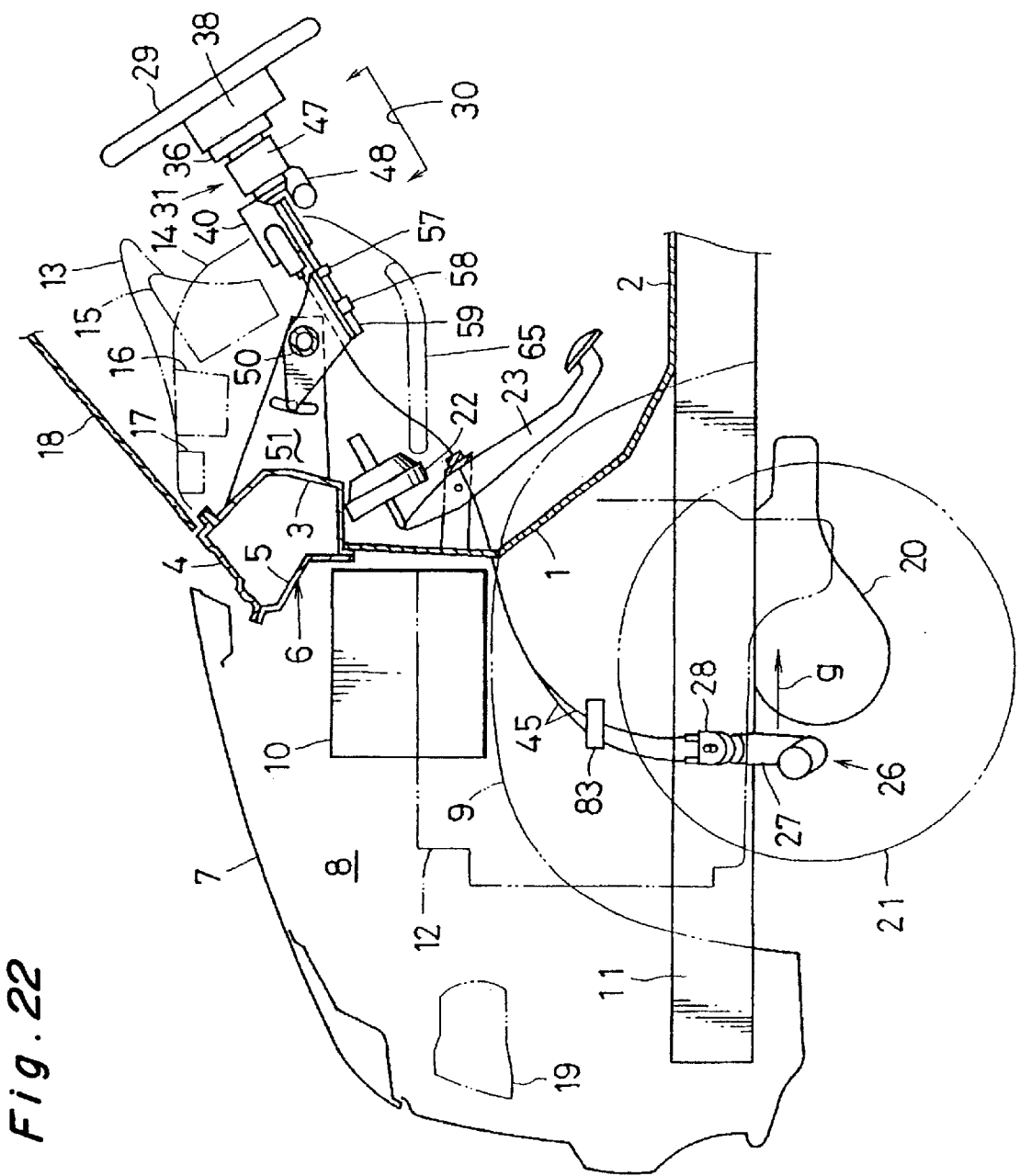
FIG. 22 is a side view showing another embodiment of the steering structure of the vehicle of the invention.
Figure 23:
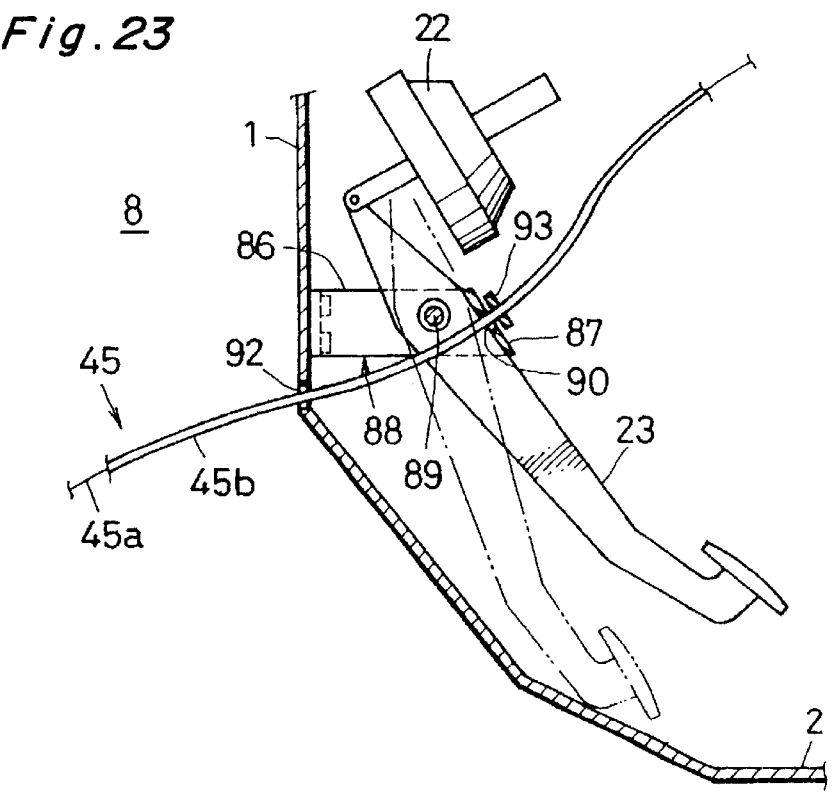
FIG. 23 is an enlarged view of an essential portion of FIG. 22.
Figure 24:
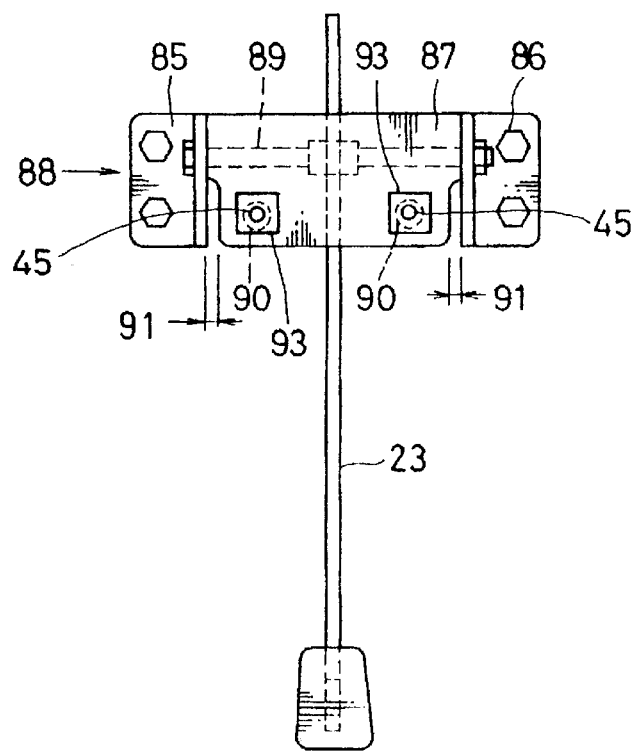
FIG. 24 is a right side view of an essential portion of FIG. 23.

FIGS. 22, 23 and 24 show another embodiment of the steering structure of a vehicle.

In this embodiment, the pair of cables 45 and 45 are supported by a member which is retreated at the time of collision, i.e., the engine 12 using the cable holder 83 shown in FIG. 18. By retreating the cables 45 and 45, the steering pedal 23 is moved forward by a predetermined distance.

That is, as shown in FIGS. 23 and 24 in enlarged scale, a pedal supporting bracket 88 comprising three members, i.e., a pair of left and right legs 85, 86 and a connected portion 87 is provided. The legs 85 and 86 are fixed to predetermined portions of the dash lower panel 1, and the break pedal 23 is operated around a supporting shaft 89 provided on the pedal supporting bracket 88.

A connected portion 87 of the pedal supporting bracket 88 is formed with through holes 90 and 90 through which the pair of cables 45 and 45 are passed. Notches 91 and 91 are formed between the left and right legs 85 and 86 and the connected portion 87 for deforming the connected portion 87 when a load equal to or greater than a predetermined value is applied to the connected portion 87.

Locking members 93 and 93 are mounted to portions of the outer tubes 45b and 45b in the vicinity of a rear face of the connected portion 87 of the pair of cables 45 and 45 pulled out toward the engine room 8 through the through holes 90 and 90 and a through hole 92 of the dash lower panel 1 from the steering wheel 29.

With this structure, when the vehicle collides, the steering unit 26 and the engine 12 are retreated, the pulley box 28 of the pair of cables 45 and 45 is retreated and with this movement, a force pulling the cables 45 and 45 forward is applied to the mounting portion of the locking members 93 and 93 of the cables 45 and 45 by the winding of the cables 45 and 45. With this force, the locking members 93 and 93 fixed to the outer tubes 45b and 45b move forward to deform the connected portion 87 of the pedal supporting bracket 88 forward.

Therefore, the break pedal 23 moves forward by the predetermined distance from a solid line position shown in FIG. 23 to a position shown with a phantom line in FIG. 23.

As described above, according to the embodiment shown in FIGS. 22 to 24 (embodiment corresponding to the tenth aspect of the present invention), the transmitting member (see cable 45) supported by the member (see engine 12) which moves at the time of collision through the cable holder 83 is retreated to move the pedal (see break pedal 23) forward by the predetermined distance.

As a result, the transmitting member (see cable 45) is not cut at the time of collision, and the minimum running of the vehicle is ensured even at the time of collision. Further, since the pedal (see break pedal 23) is moved forward by the transmitting member (see cable 45), there is an effect that foot of the crew member are not damaged, and the safety at the time of collision can be further enhanced.

Other structure, operation and effect of this embodiment shown in FIGS. 22 to 24 are substantially the same as those of the previous embodiment, elements similar to those shown in the previous embodiment are designated by the same reference numerals in FIGS. 22 to 24, and detailed explanation thereof will be omitted.

Relations in the structure of the invention and embodiments are as follows:

The steered wheel of the invention correspond to front wheels 21 of the embodiment, The flexible transmitting member corresponds to a pair of cables 45, The portion of the flexible transmitting member to be cut and separated corresponds to to-be separated portion 45c, The cutting member corresponds to the alternator 68, The supporting member corresponds to the cable holders 70 and 70, The connected portion between the transmitting member and the operation detecting unit corresponds to the connected portions 73 and 76, The connected portion between the transmitting member and the steering unit corresponds to the connected portions 78 and 79, The same member corresponds to the engine 12 which is retreated at the time of head-on collision, The member which moves at the time of collision corresponds to the engine 12 which is retreated at the time of collision, and The pedal corresponds to the break pedal 23.

However, the present invention is not limited to the above structures of the embodiments only.

For example, the above-described embodiments can be combined, i.e., the embodiment shown in FIG. 10 may be combined with the embodiment shown in FIGS. 22 to 24 to form the steering structure of a vehicle, or the embodiment shown in FIGS. 20 and 21 may be combined with the embodiment shown in FIGS. 22 to 24 to form the steering structure of a vehicle.

What is claimed is:

1. A steering structure of a vehicle comprising
an operation detecting unit provided in a cabin for detecting an operation of a steering wheel by a crew member,
a steering unit provided in an engine room for steering steered wheels, and
a flexible transmitting member for connecting said operation detecting unit and said steering unit, wherein
said transmitting member is provided with a portion which is separated when a load equal to or greater than a predetermined value is applied to said transmitting member from outside.

2. A steering structure of a vehicle according to claim 1, wherein a predetermined portion of said vehicle corresponding to said transmitting member is provided with a cutting member which is retreated by a load from outside to cut said transmitting member.

3. A steering structure of a vehicle comprising
an operation detecting unit provided in a cabin for detecting an operation of a steering wheel by a crew member,
a steering unit provided in an engine room for steering steered wheels, and
a flexible transmitting member for connecting said operation detecting unit and said steering unit, wherein
a supporting member is provided for supporting said transmitting member at a predetermined portion of a body of said vehicle, and
said supporting member releases the support of said transmitting member from the body of said vehicle when a relative displacement between said supporting member and said transmitting member exceeds a predetermined amount.

4. A steering structure of a vehicle according to any one of claims 1 to 3, wherein a connecting portion between said transmitting member and said operation detecting unit is disengaged from each other when said transmitting member and said operation detecting unit are relatively moved with a relative displacement equal to or greater than a predetermined value.

5. A steering wheel structure of a vehicle according to any one of claims 1 to 3 wherein a connecting portion between said transmitting member and said steering unit is disengaged from each other when said transmitting member and said steering unit are relatively moved with a relative displacement equal to or greater than a predetermined value.

6. A steering structure of a vehicle according to claim 5, wherein said transmitting member is connected to said steering unit from a front thereof, and said steering unit and said transmitting member are disconnected from each other when said steering unit is retreated by a load applied from outside.

7. A steering structure of a vehicle comprising
a steering wheel provided in a cabin for operation by a crew member,
a steering unit provided in an engine room for steering steered wheels, and
a cable member for transmitting an operation of said steering wheel by said crew member to said steering unit, wherein
said cable member is disposed with a predetermined deflection using a cable holder,
a vicinity of a lower end of said cable member is supported by a member which is retreated at the time of a collision of said vehicle, and
said cable holder reduces said predetermined deflection of said cable member to prevent a variation in an angle of said steering wheel caused by a behavior of said cable member as said member is retreated at the time of collision of said vehicle.

8. A steering structure of a vehicle according to claim 7, wherein
said cable member comprises a pair of cables, both of said cables are supported by said member,
said cable holder is elongated in a direction perpendicular to a longitudinal direction of said cables and supports said pair of cables at its opposite ends, and
said opposite ends of said cable holder get closer to each other to reduce said predetermined deflection of said pair of cables as said member is retreated at the time of collision of said vehicle.

9. A steering structure of a vehicle comprising a steering wheel provided in a cabin for operation by a crew member,
a steering unit provided in an engine room for steering steered wheels, and
a cable member for transmitting an operation of said steering wheel by said crew member to said steering unit, wherein
said cable member is supported by a member which moves at the time of a collision, and
said steering wheel is moved forward by a predetermined distance by a retreating movement of said cable member as said member is retreated at the time of collision of said vehicle.

10. A steering structure of a vehicle comprising
an operation detecting unit provided in a cabin for detecting an operation of a steering wheel by a crew member,
a steering unit provided in an engine room for steering steered wheels, and
a flexible transmitting member for connecting said operation detecting unit and said steering unit, wherein
said transmitting member is supported by a member which moves at the time of collision, and
a pedal is moved forward by a predetermined distance by a retreating movement of said transmitting member.

11. A steering structure of a vehicle according to claim 9, wherein
said steering wheel is movable forward by a predetermined distance,
a lock member for preventing said steering wheel from moving forward is provided,
a lower portion of said cable member is supported by a member which is retreated at the time of collision of said vehicle, and
said lock member is broken to allow said steering wheel to move forward as said member is retreated at the time of collision of said vehicle.

12. A steering structure of a vehicle comprising a steering wheel provided in a cabin and for operation by a crew member,
a steering unit provided in an engine room for steering steered wheels, and
a cable member for transmitting an operation of said steering wheel by said crew member to said steering unit, wherein
said cable member is provided with a portion which is separated when a load equal to or greater than a predetermined value is applied to said cable member from outside.

13. A steering structure of a vehicle comprising a steering wheel provided in a cabin and for operation by a crew member,
- a steering unit provided in an engine room for steering steered wheels, and
- a cable member for transmitting an operation of said steering wheel by said crew member to said steering unit, wherein
- a supporting member is provided for supporting said cable member at a predetermined portion of a body of said vehicle, and
- said supporting member releases the support of said cable member from the body of said vehicle when a relative displacement between said supporting member and said cable member exceeds a predetermined amount.

14. A steering structure of a vehicle comprising a steering wheel provided in a cabin and for operation by a crew member,
- a steering unit provided in an engine room for steering steered wheels, and
- a cable member for transmitting an operation of said steering wheel by said crew member to said steering unit, wherein
- said cable member is supported by a member which moves at the time of collision, and
- a pedal is moved forward by a predetermined distance by a retreating movement of said cable member.

* * * * *